United States Patent
Shastry et al.

(10) Patent No.: US 11,023,890 B2
(45) Date of Patent: Jun. 1, 2021

(54) IDENTIFICATION AND VERIFICATION FOR PROVISIONING MOBILE APPLICATION

(71) Applicant: VISA INTERNATIONAL SERVICE ASSOCIATION, San Francisco, CA (US)

(72) Inventors: Vishwanath Shastry, Mountain View, CA (US); Shalini Mayor, Foster City, CA (US); Calvin Chen, Fremont, CA (US)

(73) Assignee: Visa International Service Association, San Francisco, CA (US)

( * ) Notice: Subject to any disclaimer, the term of this patent is extended or adjusted under 35 U.S.C. 154(b) by 887 days.

(21) Appl. No.: 14/732,458

(22) Filed: Jun. 5, 2015

(65) Prior Publication Data

US 2015/0356560 A1    Dec. 10, 2015

Related U.S. Application Data

(60) Provisional application No. 62/008,399, filed on Jun. 5, 2014.

(51) Int. Cl.
*G06Q 20/40* (2012.01)
*G06Q 20/38* (2012.01)

(52) U.S. Cl.
CPC ..... *G06Q 20/401* (2013.01); *G06Q 20/38215* (2013.01); *G06Q 20/405* (2013.01)

(58) Field of Classification Search
None
See application file for complete search history.

(56) References Cited

U.S. PATENT DOCUMENTS

| 5,613,012 | A | 3/1997 | Hoffman et al. |
| 5,781,438 | A | 7/1998 | Lee et al. |
| | | (Continued) | |

FOREIGN PATENT DOCUMENTS

| EP | 2156397 A1 | 2/2010 |
| JP | 2000194770 | 7/2000 |
| | (Continued) | |

OTHER PUBLICATIONS

Author unknown, Device Fingerprinting and Fraud Protection Whitepaper, Published Oct. 8, 2013, retrieved Jun. 4, 2018, entire document pertitent, https://web.archive.org/web/20131001000000*/http://www.cse.iitd.ernet.in/~siy117527/sil765/readings/Device-Fingerprinting-and-Online-Fraud-Protection-Whitepaper.pdf.*

(Continued)

*Primary Examiner* — Elda G Milef
*Assistant Examiner* — Gregory S Cunningham, II
(74) *Attorney, Agent, or Firm* — Kilpatrick Townsend & Stockton LLP

(57) ABSTRACT

Embodiments are directed to the generation of a token associated with a status. The status of the token may affect how the token is treated and the types of restrictions placed on the token. The status of the token may indicate that the token is generated based on verification of secure user data. Alternatively, the status of the token may indicate that the token is generated based on insufficient user data and, as such, restrictions may be imposed on the token. The token requestor may be a mobile application, such as a merchant mobile application provisioning on a user device. In response to a token request from the merchant, the token provider issues tokens with varying status based on a confidence level. The status of the token may be indicated in terms of token assurance level.

20 Claims, 11 Drawing Sheets

(56) References Cited

U.S. PATENT DOCUMENTS

| | | | |
|---|---|---|---|
| 5,883,810 A | 3/1999 | Franklin et al. |
| 5,953,710 A | 9/1999 | Fleming |
| 5,956,699 A | 9/1999 | Wong et al. |
| 6,000,832 A | 12/1999 | Franklin et al. |
| 6,014,635 A | 1/2000 | Harris et al. |
| 6,044,360 A | 3/2000 | Picciallo |
| 6,163,771 A | 12/2000 | Walker et al. |
| 6,227,447 B1 | 5/2001 | Campisano |
| 6,236,981 B1 | 5/2001 | Hill |
| 6,267,292 B1 | 7/2001 | Walker et al. |
| 6,327,578 B1 | 12/2001 | Linehan |
| 6,341,724 B2 | 1/2002 | Campisano |
| 6,385,596 B1 | 5/2002 | Wiser et al. |
| 6,422,462 B1 | 7/2002 | Cohen |
| 6,425,523 B1 | 7/2002 | Shem-Ur et al. |
| 6,592,044 B1 | 7/2003 | Wong et al. |
| 6,636,833 B1 | 10/2003 | Flitcroft et al. |
| 6,748,367 B1 | 6/2004 | Lee |
| 6,805,287 B2 | 10/2004 | Bishop et al. |
| 6,879,965 B2 | 4/2005 | Fung et al. |
| 6,891,953 B1 | 5/2005 | DeMello et al. |
| 6,901,387 B2 | 5/2005 | Wells et al. |
| 6,931,382 B2 | 8/2005 | Laage et al. |
| 6,938,019 B1 | 8/2005 | Uzo |
| 6,941,285 B2 | 9/2005 | Sarcanin |
| 6,980,670 B1 | 12/2005 | Hoffman et al. |
| 6,990,470 B2 | 1/2006 | Hogan et al. |
| 6,991,157 B2 | 1/2006 | Bishop et al. |
| 7,051,929 B2 | 5/2006 | Li |
| 7,069,249 B2 | 6/2006 | Stolfo et al. |
| 7,103,576 B2 | 9/2006 | Mann, III et al. |
| 7,113,930 B2 | 9/2006 | Eccles et al. |
| 7,136,835 B1 | 11/2006 | Flitcroft et al. |
| 7,177,835 B1 | 2/2007 | Walker et al. |
| 7,177,848 B2 | 2/2007 | Hogan et al. |
| 7,194,437 B1 | 3/2007 | Britto et al. |
| 7,209,561 B1 | 4/2007 | Shankar et al. |
| 7,264,154 B2 | 9/2007 | Harris |
| 7,287,692 B1 | 10/2007 | Patel et al. |
| 7,292,999 B2 | 11/2007 | Hobson et al. |
| 7,350,230 B2 | 3/2008 | Forrest |
| 7,353,382 B2 | 4/2008 | Labrou et al. |
| 7,379,919 B2 | 5/2008 | Hogan et al. |
| RE40,444 E | 7/2008 | Linehan |
| 7,415,443 B2 | 8/2008 | Hobson et al. |
| 7,444,676 B1 | 10/2008 | Asghari-Kamrani et al. |
| 7,469,151 B2 | 12/2008 | Khan et al. |
| 7,548,889 B2 | 6/2009 | Bhambri et al. |
| 7,559,464 B2 | 7/2009 | Routhenstein |
| 7,567,934 B2 | 7/2009 | Flitcroft et al. |
| 7,567,936 B1 | 7/2009 | Peckover et al. |
| 7,571,139 B1 | 8/2009 | Giordano et al. |
| 7,571,142 B1 | 8/2009 | Flitcroft et al. |
| 7,580,898 B2 | 8/2009 | Brown et al. |
| 7,584,153 B2 | 9/2009 | Brown et al. |
| 7,593,896 B1 | 9/2009 | Flitcroft et al. |
| 7,606,560 B2 | 10/2009 | Labrou et al. |
| 7,627,531 B2 | 12/2009 | Breck et al. |
| 7,627,895 B2 | 12/2009 | Gifford et al. |
| 7,650,314 B1 | 1/2010 | Saunders |
| 7,685,037 B2 | 3/2010 | Reiners et al. |
| 7,702,578 B2 | 4/2010 | Fung et al. |
| 7,707,120 B2 | 4/2010 | Dominguez et al. |
| 7,712,655 B2 | 5/2010 | Wong |
| 7,734,527 B2 | 6/2010 | Uzo |
| 7,753,265 B2 | 7/2010 | Harris |
| 7,770,789 B2 | 8/2010 | Oder, II et al. |
| 7,784,685 B1 | 8/2010 | Hopkins, III |
| 7,793,851 B2 | 9/2010 | Mullen |
| 7,801,826 B2 | 9/2010 | Labrou et al. |
| 7,805,376 B2 | 9/2010 | Smith |
| 7,805,378 B2 | 9/2010 | Berardi et al. |
| 7,818,264 B2 | 10/2010 | Hammad |
| 7,828,220 B2 | 11/2010 | Mullen |
| 7,835,960 B2 | 11/2010 | Breck et al. |
| 7,841,523 B2 | 11/2010 | Oder, II et al. |
| 7,841,539 B2 | 11/2010 | Hewton |
| 7,844,550 B2 | 11/2010 | Walker et al. |
| 7,848,980 B2 | 12/2010 | Carlson |
| 7,849,020 B2 | 12/2010 | Johnson |
| 7,853,529 B1 | 12/2010 | Walker et al. |
| 7,853,995 B2 | 12/2010 | Chow et al. |
| 7,865,414 B2 | 1/2011 | Fung et al. |
| 7,873,579 B2 | 1/2011 | Hobson et al. |
| 7,873,580 B2 | 1/2011 | Hobson et al. |
| 7,890,393 B2 | 2/2011 | Talbert et al. |
| 7,891,563 B2 | 2/2011 | Oder, II et al. |
| 7,896,238 B2 | 3/2011 | Fein et al. |
| 7,908,216 B1 | 3/2011 | Davis et al. |
| 7,922,082 B2 | 4/2011 | Muscato |
| 7,931,195 B2 | 4/2011 | Mullen |
| 7,937,324 B2 | 5/2011 | Patterson |
| 7,938,318 B2 | 5/2011 | Fein et al. |
| 7,954,705 B2 | 6/2011 | Mullen |
| 7,959,076 B1 | 6/2011 | Hopkins, III |
| 7,996,288 B1 | 8/2011 | Stolfo |
| 8,025,223 B2 | 9/2011 | Saunders et al. |
| 8,046,256 B2 | 10/2011 | Chien et al. |
| 8,060,448 B2 | 11/2011 | Jones |
| 8,060,449 B1 | 11/2011 | Zhu |
| 8,074,877 B2 | 12/2011 | Mullen et al. |
| 8,074,879 B2 | 12/2011 | Harris |
| 8,082,210 B2 | 12/2011 | Hansen |
| 8,095,113 B2 | 1/2012 | Kean et al. |
| 8,104,679 B2 | 1/2012 | Brown |
| RE43,157 E | 2/2012 | Bishop et al. |
| 8,109,436 B1 | 2/2012 | Hopkins, III |
| 8,121,942 B2 | 2/2012 | Carlson et al. |
| 8,121,956 B2 | 2/2012 | Carlson et al. |
| 8,126,449 B2 | 2/2012 | Beenau et al. |
| 8,171,525 B1 | 5/2012 | Pelly et al. |
| 8,175,973 B2 | 5/2012 | Davis et al. |
| 8,190,523 B2 | 5/2012 | Patterson |
| 8,196,813 B2 | 6/2012 | Vadhri |
| 8,205,791 B2 | 6/2012 | Randazza et al. |
| 8,219,489 B2 | 7/2012 | Patterson |
| 8,224,702 B2 | 7/2012 | Mengerink et al. |
| 8,225,385 B2 | 7/2012 | Chow et al. |
| 8,229,852 B2 | 7/2012 | Carlson |
| 8,265,993 B2 | 9/2012 | Chien et al. |
| 8,280,777 B2 | 10/2012 | Mengerink et al. |
| 8,281,991 B2 | 10/2012 | Wentker et al. |
| 8,327,142 B2 * | 12/2012 | Lund .................. H04L 63/0823 713/169 |
| 8,328,095 B2 | 12/2012 | Oder, II et al. |
| 8,336,088 B2 | 12/2012 | Raj et al. |
| 8,346,666 B2 | 1/2013 | Lindelsee et al. |
| 8,376,225 B1 | 2/2013 | Hopkins, III |
| 8,380,177 B2 | 2/2013 | Laracey |
| 8,387,873 B2 | 3/2013 | Saunders et al. |
| 8,401,539 B2 | 3/2013 | Beenau et al. |
| 8,401,898 B2 | 3/2013 | Chien et al. |
| 8,402,555 B2 | 3/2013 | Grecia |
| 8,403,211 B2 | 3/2013 | Brooks et al. |
| 8,412,623 B2 | 4/2013 | Moon et al. |
| 8,412,837 B1 | 4/2013 | Emigh et al. |
| 8,417,642 B2 | 4/2013 | Oren et al. |
| 8,447,699 B2 | 5/2013 | Batada et al. |
| 8,453,223 B2 | 5/2013 | Svigals et al. |
| 8,453,925 B2 | 6/2013 | Fisher et al. |
| 8,458,487 B1 | 6/2013 | Palgon et al. |
| 8,478,898 B2 | 7/2013 | Harvey et al. |
| 8,484,134 B2 | 7/2013 | Hobson et al. |
| 8,485,437 B2 | 7/2013 | Mullen et al. |
| 8,494,959 B2 | 7/2013 | Hathaway et al. |
| 8,498,908 B2 | 7/2013 | Mengerink et al. |
| 8,504,475 B2 | 8/2013 | Brand et al. |
| 8,504,478 B2 | 8/2013 | Saunders et al. |
| 8,510,816 B2 | 8/2013 | Quach et al. |
| 8,433,116 B2 | 9/2013 | Davis et al. |
| 8,528,067 B2 | 9/2013 | Hurry et al. |
| 8,533,860 B1 | 9/2013 | Grecia |
| 8,538,845 B2 | 9/2013 | Liberty |
| 8,555,079 B2 | 10/2013 | Shablygin et al. |

(56) References Cited

U.S. PATENT DOCUMENTS

| | | |
|---|---|---|
| 8,566,168 B1 | 10/2013 | Bierbaum et al. |
| 8,567,670 B2 | 10/2013 | Stanfield et al. |
| 8,571,939 B2 | 10/2013 | Lindsey et al. |
| 8,577,336 B2 | 11/2013 | Mechaley, Jr. |
| 8,577,803 B2 | 11/2013 | Chatterjee et al. |
| 8,577,813 B2 | 11/2013 | Weiss |
| 8,578,176 B2 | 11/2013 | Mattsson |
| 8,583,494 B2 | 11/2013 | Fisher |
| 8,584,251 B2 | 11/2013 | Mcguire et al. |
| 8,589,237 B2 | 11/2013 | Fisher |
| 8,589,271 B2 | 11/2013 | Evans |
| 8,589,291 B2 | 11/2013 | Carlson et al. |
| 8,595,098 B2 | 11/2013 | Starai et al. |
| 8,595,812 B2 | 11/2013 | Bomar et al. |
| 8,595,850 B2 | 11/2013 | Spies et al. |
| 8,606,638 B2 | 12/2013 | Dragt |
| 8,606,700 B2 | 12/2013 | Carlson et al. |
| 8,606,720 B1 | 12/2013 | Baker et al. |
| 8,613,055 B1 | 12/2013 | Tomilson et al. |
| 8,615,468 B2 | 12/2013 | Varadarajan |
| 8,620,754 B2 | 12/2013 | Fisher |
| 8,635,157 B2 | 1/2014 | Smith et al. |
| 8,646,059 B1 | 2/2014 | Von Behren et al. |
| 8,651,374 B2 | 2/2014 | Brabson et al. |
| 8,656,180 B2 | 2/2014 | Shablygin et al. |
| 8,682,802 B1 | 3/2014 | Kannanari |
| 8,726,361 B2 | 5/2014 | Radhakrishnan |
| 8,751,391 B2 | 6/2014 | Freund |
| 8,762,263 B2 | 6/2014 | Gauthier et al. |
| 8,793,186 B2 | 7/2014 | Patterson |
| 8,838,982 B2 | 9/2014 | Carlson et al. |
| 8,856,539 B2 | 10/2014 | Weiss |
| 8,887,308 B2 | 11/2014 | Grecia |
| 8,887,994 B1 | 11/2014 | Thomas |
| 9,065,643 B2 | 6/2015 | Hurry et al. |
| 9,070,129 B2 | 6/2015 | Sheets et al. |
| 9,100,826 B2 | 8/2015 | Weiss |
| 9,160,741 B2 | 10/2015 | Wentker et al. |
| 9,229,964 B2 | 1/2016 | Stevelinck |
| 9,245,267 B2 | 1/2016 | Singh |
| 9,249,241 B2 | 2/2016 | Dai et al. |
| 9,256,871 B2 | 2/2016 | Anderson et al. |
| 9,280,765 B2 | 3/2016 | Hammad |
| 9,530,137 B2 | 12/2016 | Weiss |
| 9,680,942 B2 | 6/2017 | Dimmick |
| 9,996,835 B2 | 6/2018 | Dill et al. |
| 2001/0029485 A1 | 10/2001 | Brody et al. |
| 2001/0034720 A1 | 10/2001 | Armes |
| 2001/0051915 A1 | 12/2001 | Ueno et al. |
| 2001/0054003 A1 | 12/2001 | Chien et al. |
| 2002/0007320 A1 | 1/2002 | Hogan et al. |
| 2002/0016749 A1 | 2/2002 | Borecki et al. |
| 2002/0029193 A1 | 3/2002 | Ranjan et al. |
| 2002/0035548 A1 | 3/2002 | Hogan et al. |
| 2002/0038292 A1 | 3/2002 | Quelene |
| 2002/0073045 A1 | 6/2002 | Rubin et al. |
| 2002/0116341 A1 | 8/2002 | Hogan et al. |
| 2002/0120584 A1 | 8/2002 | Hogan et al. |
| 2002/0133467 A1 | 9/2002 | Hobson et al. |
| 2002/0147913 A1 | 10/2002 | Lun Yip |
| 2003/0028481 A1 | 2/2003 | Flitcroft et al. |
| 2003/0101348 A1 | 5/2003 | Russo et al. |
| 2003/0115142 A1 | 6/2003 | Brickell et al. |
| 2003/0120554 A1 | 6/2003 | Hogan et al. |
| 2003/0130955 A1 | 7/2003 | Hawthorne |
| 2003/0191709 A1 | 10/2003 | Elston et al. |
| 2003/0191945 A1 | 10/2003 | Keech |
| 2004/0010462 A1 | 1/2004 | Moon et al. |
| 2004/0050928 A1 | 3/2004 | Bishop et al. |
| 2004/0059682 A1 | 3/2004 | Hasumi et al. |
| 2004/0093281 A1 | 5/2004 | Silverstein et al. |
| 2004/0139008 A1 | 7/2004 | Mascavage, III |
| 2004/0143532 A1 | 7/2004 | Lee |
| 2004/0158532 A1 | 8/2004 | Breck et al. |
| 2004/0210449 A1 | 10/2004 | Breck et al. |
| 2004/0210498 A1 | 10/2004 | Freund |
| 2004/0232225 A1 | 11/2004 | Bishop et al. |
| 2004/0260646 A1 | 12/2004 | Berardi et al. |
| 2005/0037735 A1 | 2/2005 | Coutts |
| 2005/0080730 A1 | 4/2005 | Sorrentino |
| 2005/0108178 A1 | 5/2005 | York |
| 2005/0149440 A1 | 7/2005 | Michelassi et al. |
| 2005/0199709 A1 | 9/2005 | Linlor |
| 2005/0246293 A1 | 11/2005 | Ong |
| 2005/0269401 A1 | 12/2005 | Spitzer et al. |
| 2005/0269402 A1 | 12/2005 | Spitzer et al. |
| 2005/0278542 A1* | 12/2005 | Pierson .............. H04L 63/0876 713/182 |
| 2006/0235795 A1 | 10/2006 | Johnson et al. |
| 2006/0235796 A1 | 10/2006 | Johnson et al. |
| 2006/0237528 A1 | 10/2006 | Bishop et al. |
| 2006/0278704 A1 | 12/2006 | Saunders et al. |
| 2007/0107044 A1 | 5/2007 | Yuen et al. |
| 2007/0129955 A1 | 6/2007 | Dalmia et al. |
| 2007/0136193 A1 | 6/2007 | Starr |
| 2007/0136211 A1 | 6/2007 | Brown et al. |
| 2007/0170247 A1 | 7/2007 | Friedman |
| 2007/0179885 A1 | 8/2007 | Bird et al. |
| 2007/0208671 A1 | 9/2007 | Brown et al. |
| 2007/0245414 A1 | 10/2007 | Chan et al. |
| 2007/0288377 A1 | 12/2007 | Shaked |
| 2007/0291995 A1 | 12/2007 | Rivera |
| 2008/0015988 A1 | 1/2008 | Brown et al. |
| 2008/0029607 A1 | 2/2008 | Mullen |
| 2008/0035738 A1 | 2/2008 | Mullen |
| 2008/0052226 A1 | 2/2008 | Agarwal et al. |
| 2008/0054068 A1 | 3/2008 | Mullen |
| 2008/0054079 A1 | 3/2008 | Mullen |
| 2008/0054081 A1 | 3/2008 | Mullen |
| 2008/0065554 A1 | 3/2008 | Hogan et al. |
| 2008/0065555 A1 | 3/2008 | Mullen |
| 2008/0154770 A1 | 6/2008 | Rutherford et al. |
| 2008/0201264 A1 | 8/2008 | Brown et al. |
| 2008/0201265 A1 | 8/2008 | Hewton |
| 2008/0223918 A1 | 9/2008 | Williams et al. |
| 2008/0228646 A1 | 9/2008 | Myers et al. |
| 2008/0243702 A1 | 10/2008 | Hart et al. |
| 2008/0245855 A1 | 10/2008 | Fein et al. |
| 2008/0245861 A1 | 10/2008 | Fein et al. |
| 2008/0283591 A1 | 11/2008 | Oder, II et al. |
| 2008/0302869 A1 | 12/2008 | Mullen |
| 2008/0302876 A1 | 12/2008 | Mullen |
| 2008/0313264 A1 | 12/2008 | Pestoni |
| 2009/0006262 A1 | 1/2009 | Brown et al. |
| 2009/0010488 A1 | 1/2009 | Matsuoka et al. |
| 2009/0037333 A1 | 2/2009 | Flitcroft et al. |
| 2009/0037388 A1 | 2/2009 | Cooper et al. |
| 2009/0043702 A1 | 2/2009 | Bennett |
| 2009/0048953 A1 | 2/2009 | Hazel et al. |
| 2009/0048971 A1 | 2/2009 | Hathaway et al. |
| 2009/0106112 A1 | 4/2009 | Dalmia et al. |
| 2009/0106160 A1 | 4/2009 | Skowronek |
| 2009/0117883 A1 | 5/2009 | Coffing et al. |
| 2009/0134217 A1 | 5/2009 | Flitcroft et al. |
| 2009/0157555 A1 | 6/2009 | Biffle et al. |
| 2009/0159673 A1 | 6/2009 | Mullen et al. |
| 2009/0159700 A1 | 6/2009 | Mullen et al. |
| 2009/0159707 A1 | 6/2009 | Mullen et al. |
| 2009/0173782 A1 | 7/2009 | Muscato |
| 2009/0200371 A1 | 8/2009 | Kean et al. |
| 2009/0248583 A1 | 10/2009 | Chhabra |
| 2009/0276347 A1 | 11/2009 | Kargman |
| 2009/0281948 A1 | 11/2009 | Carlson |
| 2009/0294527 A1 | 12/2009 | Brabson et al. |
| 2009/0307139 A1 | 12/2009 | Mardikar et al. |
| 2009/0308921 A1 | 12/2009 | Mullen |
| 2009/0327131 A1 | 12/2009 | Beenau et al. |
| 2010/0008535 A1 | 1/2010 | Abulafia et al. |
| 2010/0011215 A1 | 1/2010 | Lior et al. |
| 2010/0063895 A1 | 3/2010 | Dominguez et al. |
| 2010/0088237 A1 | 4/2010 | Wankmueller |
| 2010/0094755 A1 | 4/2010 | Kloster |
| 2010/0106644 A1 | 4/2010 | Annan et al. |
| 2010/0120408 A1 | 5/2010 | Beenau et al. |

(56) References Cited

U.S. PATENT DOCUMENTS

| | | |
|---|---|---|
| 2010/0133334 A1 | 6/2010 | Vadhri |
| 2010/0138347 A1 | 6/2010 | Chen |
| 2010/0145860 A1 | 6/2010 | Pelegero |
| 2010/0161433 A1 | 6/2010 | White |
| 2010/0185545 A1 | 7/2010 | Royyuru et al. |
| 2010/0211505 A1 | 8/2010 | Saunders et al. |
| 2010/0223186 A1 | 9/2010 | Hogan et al. |
| 2010/0228668 A1 | 9/2010 | Hogan et al. |
| 2010/0235284 A1 | 9/2010 | Moore |
| 2010/0258620 A1 | 10/2010 | Torreyson et al. |
| 2010/0291904 A1 | 11/2010 | Musfeldt et al. |
| 2010/0299267 A1 | 11/2010 | Faith et al. |
| 2010/0306076 A1 | 12/2010 | Taveau et al. |
| 2010/0325041 A1 | 12/2010 | Berardi et al. |
| 2011/0010292 A1 | 1/2011 | Giordano et al. |
| 2011/0016047 A1 | 1/2011 | Wu et al. |
| 2011/0016320 A1 | 1/2011 | Bergsten et al. |
| 2011/0029504 A1 | 2/2011 | King et al. |
| 2011/0040640 A1 | 2/2011 | Erikson |
| 2011/0047076 A1 | 2/2011 | Carlson et al. |
| 2011/0083018 A1 | 4/2011 | Kesanupalli et al. |
| 2011/0087596 A1 | 4/2011 | Dorsey |
| 2011/0093397 A1 | 4/2011 | Carlson et al. |
| 2011/0099377 A1 | 4/2011 | Hoornaert et al. |
| 2011/0125597 A1 | 5/2011 | Oder, II et al. |
| 2011/0125638 A1 | 5/2011 | Davis et al. |
| 2011/0153437 A1 | 6/2011 | Archer et al. |
| 2011/0153498 A1 | 6/2011 | Makhotin et al. |
| 2011/0154466 A1 | 6/2011 | Harper et al. |
| 2011/0161233 A1 | 6/2011 | Tieken |
| 2011/0178925 A1 | 7/2011 | Lindelsee et al. |
| 2011/0178926 A1 | 7/2011 | Lindelsee et al. |
| 2011/0191244 A1 | 8/2011 | Dai |
| 2011/0225643 A1 | 9/2011 | Faynberg et al. |
| 2011/0237224 A1 | 9/2011 | Coppinger |
| 2011/0238511 A1 | 9/2011 | Park et al. |
| 2011/0238573 A1 | 9/2011 | Varadarajan |
| 2011/0238576 A1 | 9/2011 | Patterson |
| 2011/0246317 A1 | 10/2011 | Coppinger |
| 2011/0258111 A1 | 10/2011 | Raj et al. |
| 2011/0272471 A1 | 11/2011 | Mullen |
| 2011/0272478 A1 | 11/2011 | Mullen |
| 2011/0276380 A1 | 11/2011 | Mullen et al. |
| 2011/0276381 A1 | 11/2011 | Mullen et al. |
| 2011/0276424 A1 | 11/2011 | Mullen |
| 2011/0276425 A1 | 11/2011 | Mullen |
| 2011/0276485 A1 | 11/2011 | Varga |
| 2011/0295745 A1 | 12/2011 | White et al. |
| 2011/0302081 A1 | 12/2011 | Saunders et al. |
| 2011/0307710 A1 | 12/2011 | McGuire et al. |
| 2012/0023567 A1 | 1/2012 | Hammad |
| 2012/0028609 A1 | 2/2012 | Hruska |
| 2012/0030047 A1 | 2/2012 | Fuentes et al. |
| 2012/0035998 A1 | 2/2012 | Chien et al. |
| 2012/0041881 A1 | 2/2012 | Basu et al. |
| 2012/0047237 A1 | 2/2012 | Arvidsson et al. |
| 2012/0060207 A1* | 3/2012 | Mardikar ............ H04L 63/105 726/4 |
| 2012/0066078 A1 | 3/2012 | Kingston et al. |
| 2012/0066758 A1 | 3/2012 | Kasturi |
| 2012/0072350 A1 | 3/2012 | Goldthwaite et al. |
| 2012/0078735 A1 | 3/2012 | Bauer et al. |
| 2012/0078798 A1 | 3/2012 | Downing et al. |
| 2012/0078799 A1 | 3/2012 | Jackson et al. |
| 2012/0095852 A1 | 4/2012 | Bauer et al. |
| 2012/0095865 A1 | 4/2012 | Doherty et al. |
| 2012/0116902 A1 | 5/2012 | Cardina et al. |
| 2012/0116976 A1 | 5/2012 | Hammad et al. |
| 2012/0123882 A1 | 5/2012 | Carlson et al. |
| 2012/0123940 A1 | 5/2012 | Killian et al. |
| 2012/0129514 A1 | 5/2012 | Beenau et al. |
| 2012/0143767 A1 | 6/2012 | Abadir |
| 2012/0143772 A1 | 6/2012 | Abadir |
| 2012/0150669 A1 | 6/2012 | Langley et al. |
| 2012/0158580 A1 | 6/2012 | Eram et al. |
| 2012/0158593 A1 | 6/2012 | Garfinkle et al. |
| 2012/0173431 A1 | 7/2012 | Ritchie et al. |
| 2012/0185386 A1 | 7/2012 | Salama et al. |
| 2012/0197807 A1 | 8/2012 | Schlesser et al. |
| 2012/0203664 A1 | 8/2012 | Torossian et al. |
| 2012/0203666 A1 | 8/2012 | Torossian et al. |
| 2012/0209778 A1 | 8/2012 | Delany |
| 2012/0215688 A1 | 8/2012 | Musser et al. |
| 2012/0215696 A1 | 8/2012 | Salonen |
| 2012/0221421 A1 | 8/2012 | Hammad |
| 2012/0226582 A1 | 9/2012 | Hammad |
| 2012/0231844 A1 | 9/2012 | Coppinger |
| 2012/0233004 A1 | 9/2012 | Bercaw |
| 2012/0246070 A1 | 9/2012 | Vadhri |
| 2012/0246071 A1 | 9/2012 | Jain et al. |
| 2012/0246079 A1 | 9/2012 | Wilson et al. |
| 2012/0259782 A1 | 10/2012 | Hammad |
| 2012/0259784 A1 | 10/2012 | Carlson |
| 2012/0265631 A1 | 10/2012 | Cronic et al. |
| 2012/0271770 A1 | 10/2012 | Harris et al. |
| 2012/0297446 A1 | 11/2012 | Webb et al. |
| 2012/0300932 A1 | 11/2012 | Cambridge et al. |
| 2012/0303503 A1 | 11/2012 | Cambridge et al. |
| 2012/0303961 A1 | 11/2012 | Kean et al. |
| 2012/0304273 A1 | 11/2012 | Bailey et al. |
| 2012/0310725 A1 | 12/2012 | Chien et al. |
| 2012/0310831 A1 | 12/2012 | Harris et al. |
| 2012/0316992 A1 | 12/2012 | Oborne |
| 2012/0317035 A1 | 12/2012 | Royyuru et al. |
| 2012/0317036 A1 | 12/2012 | Bower et al. |
| 2013/0017784 A1 | 1/2013 | Fisher |
| 2013/0018757 A1 | 1/2013 | Anderson et al. |
| 2013/0019098 A1 | 1/2013 | Gupta et al. |
| 2013/0031006 A1 | 1/2013 | Mccullagh et al. |
| 2013/0036048 A1 | 2/2013 | Campos et al. |
| 2013/0047202 A1 | 2/2013 | Radhakrishnan |
| 2013/0047245 A1 | 2/2013 | Radhakrishnan |
| 2013/0047254 A1 | 2/2013 | Radhakrishnan et al. |
| 2013/0054337 A1 | 2/2013 | Brendell et al. |
| 2013/0054466 A1 | 2/2013 | Muscato |
| 2013/0054474 A1 | 2/2013 | Yeager |
| 2013/0081122 A1 | 3/2013 | Svigals et al. |
| 2013/0091028 A1 | 4/2013 | Oder, II et al. |
| 2013/0110658 A1 | 5/2013 | Lyman et al. |
| 2013/0111599 A1 | 5/2013 | Gargiulo |
| 2013/0117185 A1 | 5/2013 | Collison et al. |
| 2013/0124290 A1 | 5/2013 | Fisher |
| 2013/0124291 A1 | 5/2013 | Fisher |
| 2013/0124364 A1 | 5/2013 | Mittal |
| 2013/0138525 A1 | 5/2013 | Bercaw |
| 2013/0144888 A1 | 6/2013 | Faith et al. |
| 2013/0145148 A1 | 6/2013 | Shablygin et al. |
| 2013/0145172 A1 | 6/2013 | Shablygin et al. |
| 2013/0159178 A1 | 6/2013 | Colon et al. |
| 2013/0159184 A1 | 6/2013 | Thaw |
| 2013/0166402 A1 | 6/2013 | Parento et al. |
| 2013/0166456 A1 | 6/2013 | Zhang et al. |
| 2013/0173736 A1 | 7/2013 | Krzeminski et al. |
| 2013/0174244 A1* | 7/2013 | Taveau ............ G06Q 20/40145 726/9 |
| 2013/0185202 A1 | 7/2013 | Goldthwaite et al. |
| 2013/0191286 A1 | 7/2013 | Cronic et al. |
| 2013/0191289 A1 | 7/2013 | Cronic et al. |
| 2013/0198071 A1 | 8/2013 | Jurss |
| 2013/0198080 A1 | 8/2013 | Anderson et al. |
| 2013/0200146 A1 | 8/2013 | Moghadam |
| 2013/0204787 A1 | 8/2013 | Dubois |
| 2013/0204793 A1 | 8/2013 | Kerridge et al. |
| 2013/0212007 A1 | 8/2013 | Mattsson et al. |
| 2013/0212017 A1 | 8/2013 | Bangia |
| 2013/0212019 A1 | 8/2013 | Mattsson et al. |
| 2013/0212024 A1 | 8/2013 | Mattsson et al. |
| 2013/0212026 A1 | 8/2013 | Powell et al. |
| 2013/0212666 A1 | 8/2013 | Mattsson et al. |
| 2013/0218698 A1 | 8/2013 | Moon et al. |
| 2013/0218769 A1 | 8/2013 | Pourfallah et al. |
| 2013/0226799 A1 | 8/2013 | Raj |
| 2013/0226813 A1 | 8/2013 | Voltz |
| 2013/0246199 A1 | 9/2013 | Carlson |

(56) References Cited

U.S. PATENT DOCUMENTS

| | | |
|---|---|---|
| 2013/0246202 A1 | 9/2013 | Tobin |
| 2013/0246203 A1 | 9/2013 | Laracey |
| 2013/0246258 A1 | 9/2013 | Dessert |
| 2013/0246259 A1 | 9/2013 | Dessert |
| 2013/0246261 A1 | 9/2013 | Purves et al. |
| 2013/0246267 A1 | 9/2013 | Tobin |
| 2013/0254028 A1 | 9/2013 | Salci |
| 2013/0254052 A1 | 9/2013 | Royyuru et al. |
| 2013/0254102 A1 | 9/2013 | Royyuru |
| 2013/0254117 A1 | 9/2013 | Von Mueller et al. |
| 2013/0262296 A1 | 10/2013 | Thomas et al. |
| 2013/0262302 A1 | 10/2013 | Lettow et al. |
| 2013/0262315 A1 | 10/2013 | Hruska |
| 2013/0262316 A1 | 10/2013 | Hruska |
| 2013/0262317 A1 | 10/2013 | Collinge et al. |
| 2013/0268776 A1 | 10/2013 | Motoyama |
| 2013/0275300 A1 | 10/2013 | Killian et al. |
| 2013/0275307 A1 | 10/2013 | Khan |
| 2013/0275308 A1 | 10/2013 | Paraskeva et al. |
| 2013/0282502 A1 | 10/2013 | Jooste |
| 2013/0282575 A1 | 10/2013 | Mullen et al. |
| 2013/0282588 A1 | 10/2013 | Hruska |
| 2013/0282589 A1 | 10/2013 | Shoup |
| 2013/0297501 A1 | 11/2013 | Monk et al. |
| 2013/0297504 A1 | 11/2013 | Nwokolo et al. |
| 2013/0297508 A1 | 11/2013 | Belamant |
| 2013/0304649 A1 | 11/2013 | Cronic et al. |
| 2013/0308778 A1 | 11/2013 | Fosmark et al. |
| 2013/0311382 A1 | 11/2013 | Fosmark et al. |
| 2013/0317982 A1 | 11/2013 | Mengerink et al. |
| 2013/0332344 A1 | 12/2013 | Weber |
| 2013/0339253 A1 | 12/2013 | Sincai |
| 2013/0346314 A1 | 12/2013 | Mogollon et al. |
| 2014/0007213 A1 | 1/2014 | Sanin et al. |
| 2014/0013106 A1 | 1/2014 | Redpath |
| 2014/0013114 A1 | 1/2014 | Redpath |
| 2014/0013452 A1 | 1/2014 | Aissi et al. |
| 2014/0019352 A1 | 1/2014 | Shrivastava |
| 2014/0025581 A1 | 1/2014 | Calman |
| 2014/0025585 A1 | 1/2014 | Calman |
| 2014/0025958 A1 | 1/2014 | Calman |
| 2014/0032417 A1 | 1/2014 | Mattsson |
| 2014/0032418 A1 | 1/2014 | Weber |
| 2014/0040137 A1 | 2/2014 | Carlson et al. |
| 2014/0040139 A1 | 2/2014 | Brudnicki et al. |
| 2014/0040144 A1 | 2/2014 | Plomske et al. |
| 2014/0040145 A1 | 2/2014 | Ozvat et al. |
| 2014/0040148 A1 | 2/2014 | Ozvat et al. |
| 2014/0040628 A1 | 2/2014 | Fort et al. |
| 2014/0041018 A1 | 2/2014 | Bomar et al. |
| 2014/0046853 A1 | 2/2014 | Spies et al. |
| 2014/0047551 A1 | 2/2014 | Nagasundaram et al. |
| 2014/0052532 A1 | 2/2014 | Tsai et al. |
| 2014/0052620 A1 | 2/2014 | Rogers et al. |
| 2014/0052637 A1 | 2/2014 | Jooste et al. |
| 2014/0068706 A1 | 3/2014 | Aissi |
| 2014/0074637 A1 | 3/2014 | Hammad |
| 2014/0074724 A1 | 3/2014 | Gordon et al. |
| 2014/0108172 A1 | 4/2014 | Weber et al. |
| 2014/0108263 A1* | 4/2014 | Ortiz .................... G06Q 20/322 705/71 |
| 2014/0108265 A1 | 4/2014 | Hayhow et al. |
| 2014/0114857 A1 | 4/2014 | Griggs et al. |
| 2014/0143137 A1 | 5/2014 | Carlson |
| 2014/0149746 A1 | 5/2014 | Yau |
| 2014/0164243 A1 | 6/2014 | Aabye et al. |
| 2014/0165179 A1 | 6/2014 | Taveau |
| 2014/0188586 A1 | 7/2014 | Carpenter et al. |
| 2014/0249945 A1 | 9/2014 | Gauthier et al. |
| 2014/0289809 A1* | 9/2014 | Taylor .................... H05B 6/645 726/4 |
| 2014/0294701 A1 | 10/2014 | Dai et al. |
| 2014/0297534 A1 | 10/2014 | Patterson |
| 2014/0310183 A1 | 10/2014 | Weber |
| 2014/0330721 A1 | 11/2014 | Wang |
| 2014/0330722 A1 | 11/2014 | Laxminarayanan et al. |
| 2014/0331265 A1 | 11/2014 | Mozell et al. |
| 2014/0337236 A1 | 11/2014 | Wong et al. |
| 2014/0344153 A1* | 11/2014 | Raj .................... G06Q 20/3821 705/44 |
| 2014/0372308 A1 | 12/2014 | Sheets |
| 2015/0019317 A1* | 1/2015 | Mitchell ............ G06Q 30/0226 705/14.27 |
| 2015/0019443 A1 | 1/2015 | Sheets et al. |
| 2015/0032625 A1 | 1/2015 | Dill et al. |
| 2015/0032626 A1 | 1/2015 | Dill et al. |
| 2015/0032627 A1 | 1/2015 | Dill et al. |
| 2015/0046338 A1 | 2/2015 | Laxminarayanan et al. |
| 2015/0046339 A1* | 2/2015 | Wong .................... G06Q 20/382 705/71 |
| 2015/0052064 A1 | 2/2015 | Karpenko et al. |
| 2015/0066768 A1* | 3/2015 | Williamson ......... G06Q 20/405 705/44 |
| 2015/0088756 A1 | 3/2015 | Makhotin et al. |
| 2015/0106239 A1 | 4/2015 | Gaddam et al. |
| 2015/0112870 A1 | 4/2015 | Nagasundaram et al. |
| 2015/0112871 A1 | 4/2015 | Kumnick |
| 2015/0120472 A1 | 4/2015 | Aabye et al. |
| 2015/0127529 A1 | 5/2015 | Makhotin et al. |
| 2015/0127547 A1* | 5/2015 | Powell ................. G06Q 20/382 705/67 |
| 2015/0140960 A1 | 5/2015 | Powell et al. |
| 2015/0142673 A1 | 5/2015 | Nelsen et al. |
| 2015/0161597 A1 | 6/2015 | Subramanian et al. |
| 2015/0161608 A1* | 6/2015 | Gilbert ............... G06Q 20/4014 705/44 |
| 2015/0178724 A1 | 6/2015 | Ngo et al. |
| 2015/0180836 A1 | 6/2015 | Wong et al. |
| 2015/0186864 A1 | 7/2015 | Jones et al. |
| 2015/0193222 A1 | 7/2015 | Pirzadeh et al. |
| 2015/0195133 A1 | 7/2015 | Sheets et al. |
| 2015/0199679 A1 | 7/2015 | Palanisamy et al. |
| 2015/0199689 A1 | 7/2015 | Kumnick et al. |
| 2015/0220917 A1 | 8/2015 | Aabye et al. |
| 2015/0237038 A1* | 8/2015 | Grajek ................ H04L 63/0815 726/8 |
| 2015/0237074 A1* | 8/2015 | Mardikar ................ H04L 63/20 726/1 |
| 2015/0269566 A1 | 9/2015 | Gaddam et al. |
| 2015/0278729 A1* | 10/2015 | Hu ..................... G06Q 10/0635 705/7.28 |
| 2015/0278799 A1 | 10/2015 | Palanisamy |
| 2015/0287037 A1 | 10/2015 | Salmon et al. |
| 2015/0312038 A1 | 10/2015 | Palanisamy |
| 2015/0319158 A1 | 11/2015 | Kumnick |
| 2015/0332262 A1 | 11/2015 | Lingappa |
| 2015/0332264 A1* | 11/2015 | Bondesen ............ G06Q 20/385 705/44 |
| 2015/0363781 A1 | 12/2015 | Badenhorst |
| 2016/0028550 A1 | 1/2016 | Gaddam et al. |
| 2016/0036790 A1 | 2/2016 | Shastry et al. |
| 2016/0042263 A1 | 2/2016 | Gaddam et al. |
| 2016/0065370 A1 | 3/2016 | Le Saint et al. |
| 2016/0092696 A1 | 3/2016 | Guglani et al. |
| 2016/0092872 A1 | 3/2016 | Prakash et al. |
| 2016/0092874 A1 | 3/2016 | O'Regan et al. |
| 2016/0103675 A1 | 4/2016 | Aabye et al. |
| 2016/0119296 A1 | 4/2016 | Laxminarayanan et al. |
| 2016/0132878 A1 | 5/2016 | O'Regan et al. |
| 2016/0140545 A1 | 5/2016 | Flurscheim et al. |
| 2016/0148197 A1 | 5/2016 | Dimmick |
| 2016/0148212 A1 | 5/2016 | Dimmick |
| 2016/0171479 A1 | 6/2016 | Prakash et al. |
| 2016/0173483 A1 | 6/2016 | Wong et al. |
| 2016/0197725 A1 | 7/2016 | Hammad |
| 2016/0224976 A1 | 8/2016 | Basu |
| 2016/0308995 A1 | 10/2016 | Youdale et al. |
| 2017/0046696 A1 | 2/2017 | Powell et al. |
| 2017/0103387 A1 | 4/2017 | Weber |
| 2017/0109745 A1 | 4/2017 | Al-Bedaiwi et al. |
| 2017/0186001 A1 | 6/2017 | Reed et al. |
| 2017/0220818 A1 | 8/2017 | Nagasundaram et al. |

(56) References Cited

U.S. PATENT DOCUMENTS

| | | |
|---|---|---|
| 2017/0228723 A1 | 8/2017 | Taylor |
| 2017/0295155 A1 | 10/2017 | Wong |
| 2017/0364903 A1 | 12/2017 | Lopez |

FOREIGN PATENT DOCUMENTS

| | | |
|---|---|---|
| JP | 2001344545 | 12/2001 |
| JP | 2002508550 | 3/2002 |
| JP | 2002366869 | 12/2002 |
| JP | 2009534741 | 9/2009 |
| JP | 2009541858 | 11/2009 |
| JP | 2009301211 | 12/2009 |
| JP | 2010165374 | 7/2010 |
| WO | 01/093129 | 5/2000 |
| WO | 2001035304 A1 | 5/2001 |
| WO | 2001035304 A9 | 5/2001 |
| WO | 2004042536 A2 | 5/2004 |
| WO | 2005043436 | 5/2005 |
| WO | 2006113834 A2 | 10/2006 |
| WO | 2007149775 | 12/2007 |
| WO | 2008144555 | 11/2008 |
| WO | 2009032523 A1 | 3/2009 |
| WO | 2009112793 | 9/2009 |
| WO | 2010078522 A1 | 7/2010 |
| WO | 2012068078 A2 | 5/2012 |
| WO | 2012098556 A1 | 7/2012 |
| WO | 2012142370 A2 | 10/2012 |
| WO | 2012151590 | 11/2012 |
| WO | 2012167941 A1 | 12/2012 |
| WO | 2013048538 A1 | 4/2013 |
| WO | 2013056104 A1 | 4/2013 |
| WO | 2013119914 A1 | 8/2013 |
| WO | 2013179271 A2 | 12/2013 |

OTHER PUBLICATIONS

Author unknown, Device Fingerprinting and Fraud Protection Whitepaper, Published Oct. 8, 2013, entire document pertitent, https://web.archive.Org/web/20131001000000Vhttp://www.cse.iitd.ernet.in/~siy117527/sil765/readings/Device-Fingerprinting-and-Online-Fraud-Protection-Whitepaper.pdf (Year: 2013).*

Wang, U.S. Appl. No. 62/000,288 (unpublished), Payment System Canonical Address Format filed May 19, 2014.

Sharma et al., U.S. Appl. No. 62/003,717 (unpublished), Mobile Merchant Application filed May 28, 2014.

Kalgi et al., U.S. Appl. No. 62/024,426, (unpublished) Secure Transactions Using Mobile Devices filed Jul. 14, 2014.

Prakash et al., U.S. Appl. No. 62/037,033 (unpublished), Sharing Payment Token filed Aug. 13, 2014.

Hoverson et al., U.S. Appl. No. 62/038,174 (unpublished), Customized Payment Gateway filed Aug. 15, 2014.

Wang, U.S. Appl. No. 62/042,050 (unpublished), Payment Device Authentication and Authorization System filed Aug. 26, 2014.

Gaddam et al., U.S. Appl. No. 62/053,736 (unpublished), Completing Transactions Without a User Payment Device filed Sep. 22, 2014.

Patterson, U.S. Appl. No. 62/054,346 (unpublished), Mirrored Token Vault filed Sep. 23, 2014.

Dimmick, U.S. Appl. No. 14/952,514 (unpublished), Systems Communications With Non-Sensitive Identifiers filed Nov. 25, 2015.

Dimmick, U.S. Appl. No. 14/952,444 (unpublished), Tokenization Request Via Access Device filed Nov. 25, 2015.

Prakash et al., U.S. Appl. No. 14/955,716 (unpublished), Provisioning Platform for Machine-To-Machine Devices filed Dec. 1, 2015.

Wong et al., U.S. Appl. No. 14/966,948 (unpublished), Automated Access Data Provisioning filed Dec. 11, 2015.

Stubbs et al., U.S. Appl. No. 62/103,522 (unpublished), Methods and Systems for Wallet Provider Provisioning filed Jan. 14, 2015.

Mcguire, U.S. Appl. No. 14/600,523 (unpublished), Secure Payment Processing Using Authorization Request filed Jan. 20, 2015.

Flurscheim et al., U.S. Appl. No. 15/004,705 (unpublished), Cloud-Based Transactions With Magnetic Secure Transmission filed Jan. 22, 2016.

Flurscheim et al., U.S. Appl. No. 62/108,403 (unpublished), Wearables With NFC HCE filed Jan. 27, 2015.

Sabba et al., U.S. Appl. No. 15/011,366 (unpublished), Token Check Offline filed Jan. 29, 2016.

Patterson, U.S. Appl. No. 15/019,157 (unpublished), Token Processing Utilizing Multiple Authorizations filed Feb. 9, 2016.

Cash et al., U.S. Appl. No. 15/041,495 (unpublished), Peer Forward Authorization of Digital Requests filed Feb. 11, 2016.

Le Saint et al.,, U.S. Appl. No. 15/008,388 (unpublished), Methods for Secure Credential Provisioning filed Jan. 27, 2016.

Kinagi, U.S. Appl. No. 62/117,291 (unpublished), Token and Cryptogram Using Transaction Specific Information filed Feb. 17, 2015.

Galland et al. U.S. Appl. No. 62/128,709 (unpublished), Tokenizing Transaction Amounts filed Mar. 5, 2015.

Rangarajan et al., U.S. Appl. No. 61/751,763 (unpublished), Payments Bridge filed Jan. 11, 2013.

Li, U.S. Appl. No. 61/894,749 (unpublished), Methods and Systems for Authentication and Issuance of Tokens in a Secure Environment filed Oct. 23, 2013.

Aissi et al., U.S. Appl. No. 61/738,832 (unpublished), Management of Sensitive Data filed Dec. 18, 2012.

Wong et al., U.S. Appl. No. 61/879,362 (unpublished), Systems and Methods for Managing Mobile Cardholder Verification Methods filed Sep. 18, 2013.

Powell, U.S. Appl. No. 61/892,407 (unpublished), Issuer Over-The-Air Update Method and System filed Oct. 17, 2013.

Powell, U.S. Appl. No. 61/926,236 (unpublished), Methods and Systems for Provisioning Mobile Devices With Payment Credentials and Payment Token Identifiers filed Jan. 10, 2014.

Petition for Inter Partes Review of U.S. Pat. No. 8,533,860 Challenging Claims 1-30 Under 35 U.S.C. § 312 and 37 C.F.R. § 42.104, filed Feb. 17, 2016, Before the USPTO Patent Trial and Appeal Board, IPR 2016-00600, 65 pages.

Chipman, et al., U.S. Appl. No. 15/265,282 (Unpublished), Self-Cleaning Token Vault, filed Sep. 14, 2016.

Lopez, et al., U.S. Appl. No. 15/462,658 (Unpublished), Replacing Token on a Multi-Token User Device, filed Mar. 17, 2017.

U.S. Appl. No. 14/340,344, "Non-Final Office Action", dated Jul. 27, 2018, 37 pages.

U.S. Appl. No. 14/340,444, "Final Office Action", dated Aug. 7, 2018, 28 pages.

Non-Final Office Action dated Nov. 28, 2018, U.S. Appl. No. 14/514,290, 28 pages.

Final Office Action dated May 10, 2019, U.S. Appl. No. 14/514,290, 21 pages.

JP2016-530052, "Office Action", dated Jul. 31, 2018.

JP2016-530054, "Office Action", dated Mar. 23, 2018, 9 pages.

U.S. Appl. No. 14/340,444, Non-Final Office Action, dated Jun. 5, 2020, 49 pages.

White, "How Computers Work" Oct. 15, 2003, Illustrated by Timothy Edward Downs, 7th Edition (Year: 2003), . 23 pages.

* cited by examiner

IDENTIFICATION AND VERIFICATION FOR PROVISIONING MOBILE APPLICATION

RELATED APPLICATIONS

This application claims the benefit of and priority to U.S. Provisional Application No. 62/008,399, filed Jun. 5, 2014 and entitled "IDENTIFICATION AND VERIFICATION FOR PROVISIONING MOBILE APPLICATION," the entire disclosure of which is incorporated herein by reference for all purposes

BACKGROUND

In a traditional electronic payment transaction, a consumer's primary account number (PAN) information is exposed to various entities involved during the transaction lifecycle. The PAN is passed from a merchant terminal, to an acquirer system, a payment processing network, payment gateways, etc. Because the PAN can be exposed at various points in the transaction lifecycle, some have suggested that payment "tokens" be used to conduct payment transactions. A token serves as an additional security layer to the PAN and in effect becomes a proxy/surrogate to the PAN and may be used in place of PAN while submitting transactions.

While conventional efforts to use payment tokens have been useful, a number of additional problems need to be solved. For example, when a user device is used to conduct payment transactions, it is difficult to accurately identify the user and bind the user's identity to the user device via a token, particularly in environments where it is not possible to obtain a static or a unique device ID.

Embodiments of the invention address these and other problems, individually and collectively.

BRIEF SUMMARY

In some embodiments of the invention, a token ecosystem is provided. The token ecosystem provides a platform that can be leveraged by various entities such as third party wallet providers, merchants, acquirers, payment processors, etc. that use tokens to facilitate payment transactions. In the token ecosystem, a token provider, such as a cloud based payment service, may issue tokens based on requests from a token requestor. The token requestor may be a mobile application, such as a merchant mobile application provisioned on a user device. The token provider may receive identifying data from the token requestor. The token provider may issue tokens with varying status based on a confidence level determined in light of the data received from the token requestor.

According to some embodiments, a method includes receiving, by a server computer, a first set of user information from at least one of a first mobile application or an authorizing server. The first mobile application may be installed/provisioned on a user device, such as a mobile phone of the user. In some embodiments, the authorizing server may have provisioned the first mobile application on the user mobile device. The first set of user information may include one or more of a device identifier, an account number, an address, a zip code, a name, a username, a telephone number or an identity assertion. The server computer may store the received first set of user information at a storage. The server computer may receive a request for a token from a second mobile application, the request comprising at least a second set of user information. The second mobile application may be installed/provisioned on a user device. In some embodiments, the first mobile application and the second mobile application may be provisioned on the same user device. Alternatively, the first mobile application and the second mobile application may be installed/provisioned on separate user devices accessible, for example, with a same username and password. The second mobile application may be a merchant application. The second set of user information may include at least a portion of the first set of user information. The second set of user information may include one or more of a device identifier, an account number, an address, a zip code, a name, a username, a telephone number, user credentials or a user authentication verification value.

The server computer may compare the first set of information with the second set of information. That is, the server computer may try to correlate the second set of information with the first set of information. The server computer may determine a confidence level based on the comparison of the first set of user information to the second set of user information. The server computer may generate a token based on the comparison. A status (e.g. an assurance level) of the token may be based at least in part on the confidence level. The status of the token may be may be indicative of a level of restriction associated with the token. The server computer may transmit the generated token to the second mobile application.

In some embodiments, after receiving the token and performing one or more transactions with the token, the second mobile application may send a transaction history to the server computer. Based on the transaction history, the server computer may change the status of the token. For example, if a token with low assurance level is provided to the second mobile application, the status of the token may be increased to high assurance level based on at least the transaction history.

According to various embodiments, the first set of information may include an authentication indicator generated by the authorizing server, an identity assertion as part of the first set of user information or an indication of an XML-based security layer validation associated with a user of the second mobile application. The status of the token may be based at least in part in the received information.

In some embodiments, a method includes receiving, by a server computer, a request for a token from a mobile application. The mobile application may be a merchant mobile application installed/provisioned on a user device. The request may include identifying information associated with an account and a value assigned to a user of the account. Upon receipt of the identifying information and the value, the server computer may validate the value assigned to the user of the account. The value assigned to the user may include a cryptogram assigned to a user device associated with the account. For example, the user device may be a payment card including a near field communications (NFC) chip. The cryptogram may be unique to the payment card and the account number associated with the payment card. In some embodiments, the value assigned to the user may include a receipt code associated with a prior transaction carried out using the account. For example, the user may complete a purchase at the merchant location. The merchant may provide the user a receipt with a unique receipt code. The server computer may determine a confidence level based on validating the value assigned to the user of the account. The server computer may generate a token. A status (e.g. an assurance level) of the token may be based at least in part on the confidence level. The status of the token may be may be indicative of a level of restriction associated with the token. The server computer may transmit the generated token to the second mobile application.

Another embodiment of the invention is directed to a computer comprising a processor, and a computer readable medium coupled to the processor. The computer readable medium comprises code, executable by the processor, for implementing the above-described methods.

These and other embodiments of the invention are described in further detail below.

DETAILED DESCRIPTION

Figure 1:
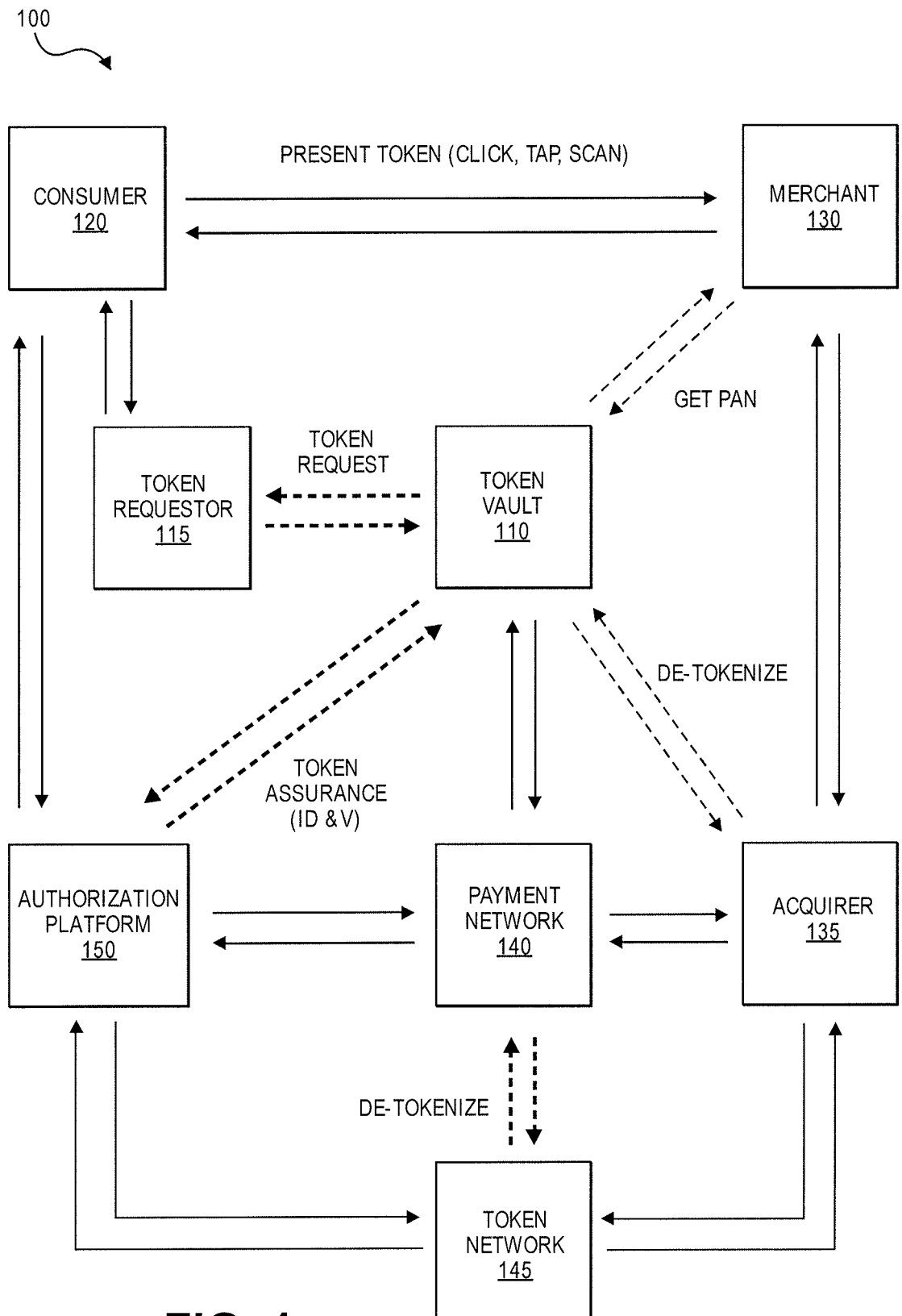
FIG. 1 shows a diagram providing an overview of the various roles involved in a token ecosystem, in accordance with some embodiments of the invention.

Embodiments of the invention provide a platform (e.g. a token ecosystem) that can be leveraged by various entities such as third party wallet providers, merchants, acquirers, payment processors and the like that use tokens to facilitate payment transactions. In the token ecosystem, a token provider, such as a cloud based payment service, may issue tokens based on requests from a token requestor. The token requestor may be a mobile application, such as a merchant mobile application provisioned on a user device. The merchant mobile application may be a mobile application (or a mobile wallet application) developed by a merchant for a user mobile device (e.g., mobile phone) to be used during transactions at merchant locations (e.g. point-of-sale (POS) devices of the merchant).

In response to a token request from the merchant, the token provider issues tokens with varying status based on a confidence level determined in light of the data received from the token requestor. For example, the status of the token may indicate that the token is a trusted token associated with a high assurance level. Such token may be used without restrictions by the merchant mobile application. Alternatively, the status of the token may indicate that the token is an untrusted token associated with a low assurance level. Such token may have restrictions imposed thereupon. For example, a token with a low assurance level may be used for transactions below a pre-determined value (e.g. money amount) or may be used only with proper user identifying information (e.g. showing user ID card, providing a PIN and/or a card verification value (e.g. CVV), user biometrics and the like).

Accordingly, embodiments of the invention relate to the generation of a token, wherein the token can be associated with a status. The status of the token may affect how the token is treated and the types of restrictions placed on the token. For example, the status of the token may indicate that the token is generated based on verification of secure user data. In some embodiments, the status of the token may indicate that the token is generated based on insufficient user data and, as such, restrictions may be imposed on the token.

Prior to discussing embodiments of the invention, description of some terms may be helpful in understanding embodiments of the invention.

A "user device" is an electronic device that may be transported and/or operated by a user. A user device may provide remote communication capabilities to a network. The user device may be configured to transmit and receive data or communications to and from other devices. In some embodiments, the user device may be portable. Examples of user devices may include mobile phones (e.g., smart phones, cellular phones, etc.), PDAs, portable media players, wearable electronic devices (e.g. smart watches, fitness bands, ankle bracelets, rings, earrings, etc.), electronic reader devices, and portable computing devices (e.g., laptops, netbooks, ultrabooks, etc.). Examples of user devices may also include automobiles with remote communication capabilities.

An "application" may include any software module configured to perform a specific function or functions when executed by a processor of a computer. For example, a "mobile application" may include a software module that is configured to be operated by a mobile device. Applications may be configured to perform many different functions. For instance, a "payment application" may include a software module that is configured to store and provide account credentials for a transaction. A "wallet application" may include a software module with similar functionality to a payment application that has multiple accounts provisioned or enrolled such that they are usable through the wallet application.

A "payment application" or "wallet application" may store credentials (e.g., account identifier, expiration date, card verification value (CVV), etc.) for accounts provisioned onto the user device. The account credentials may be stored in general memory on the mobile device or on a secure trusted execution environment (e.g., a secure element) of the user device. Further, in some embodiments, the account credentials may be stored by a remote computer and the payment/wallet application may retrieve the credentials (or a portion thereof) from the remote computer before/during a transaction. Any number of different commands or communication protocols may be used to interface with the payment application and/or wallet application in order to obtain and use stored credentials associated with each application.

The payment application or wallet application may be configured to provide credentials to an authorized software application or module on a user device. For example, a payment application may be configured to interface with a master applet in order to provide credentials to a mobile application for a transaction. For instance, the payment application may provide a software development kit (SDK) or application programming interface (API) that the master wallet applet may use to interface with the payment application and/or wallet application. The payment application and/or wallet application may be configured to provide the sensitive information in encrypted form using stored encryption keys. Thus, each payment application and/or wallet application may have different commands and/or instructions for accessing the associated credentials stored by the payment/wallet application. For instance, each payment application and/or wallet application may have a different application program interface (API) with different commands, data requirements, authentication processes, etc., for interacting with other applications operating on the user device. Accordingly, a master wallet applet may include a number of different APIs, one for each of the different payment applications and/or wallet applications that the master wallet applet is configured to interface with.

"User information" may include any information that is associated with a user. For example, the user information may include a device identifier of a device that the user owns or operates and/or account credentials of an account that the user holds. A device identifier may include a unique identifier assigned to a user device that can later be used to verify the user device. In some embodiments, the device identifier may include a device fingerprint. The device fingerprint may an aggregation of device attributes. The device fingerprint may be generated by a software development kit (SDK) provided on the user device using, for example, a unique identifier assigned by the operating system, an International Mobile Station Equipment Identity (IMEI) number, operating system (OS) version, plug-in version, and the like.

"Account credentials" may include any information that identifies an account and allows a payment processor to verify that a device, person, or entity has permission to access the account. For example, account credentials may include an account identifier (e.g., a PAN), a token (e.g., account identifier substitute), an expiration date, a cryptogram, a verification value (e.g., card verification value (CVV)), personal information associated with an account (e.g., address, etc.), an account alias, or any combination thereof. Account credentials may be static or dynamic such that they change over time. Further, in some embodiments, the account credentials may include information that is both static and dynamic. For example, an account identifier and expiration date may be static but a cryptogram may be dynamic and change for each transaction. Further, in some embodiments, some or all of the account credentials may be stored in a secure memory of a user device. The secure memory of the user device may be configured such that the data stored in the secure memory may not be directly accessible by outside applications and a payment application associated with the secure memory may be accessed to obtain the credentials stored on the secure memory. Accordingly, a mobile application may interface with a payment application in order to gain access to payment credentials stored on the secure memory.

A "merchant application" may include any application associated with a relying party to a transaction. For example, a merchant mobile application may be associated with a particular merchant or may be associated with a number of different merchants. In some embodiments, the merchant mobile application may store information identifying a particular merchant server computer that is configured to provide a sales environment in which the merchant server computer is capable of processing remote transactions initiated by the merchant application. Further, the merchant mobile application may also include a general purpose browser or other software designed to interact with one or more merchant server computers. In some cases, the merchant mobile application may be installed in the general purpose memory of a user device and thus, may be susceptible to malicious attacks.

A "token" may include any identifier for a payment account that is a substitute for an account identifier. For example, a token may include a series of alphanumeric characters that may be used as a substitute for an original account identifier. For example, a token "4900 0000 0000 0001" may be used in place of a primary account identifier or primary account number (PAN) "4147 0900 0000 1234." In some embodiments, a token may be "format preserving" and may have a numeric format that conforms to the account identifiers used in existing payment processing networks (e.g., ISO 8583 financial transaction message format). In some embodiments, a token may be used in place of a PAN to initiate, authorize, settle or resolve a payment transaction or represent the original credential in other systems where the original credential would typically be provided. In some embodiments, a token value may be generated such that the recovery of the original PAN or other account identifier from the token value may not be computationally derived. Further, in some embodiments, the token format may be configured to allow the entity receiving the token to identify it as a token and recognize the entity that issued the token. According to various embodiments, a token may be associated with a token status. The token status may indicate, for example, that the token is a high quality token or a low quality token. The status of the token may be indicative of a level of restriction associated with the token. For example, no restrictions may be imposed on a high quality token whereas restrictions such as further identification requirements may be imposed on a low quality token. The status of the token may be based at least in part on the confidence level with which the token is generated.

"Provisioning" may include a process of providing data for use. For example, provisioning may include providing, delivering, or enabling a token or a mobile application on a device.

"Tokenization" is a process by which data is replaced with substitute data. For example, a payment account identifier (e.g., a primary account number (PAN)) may be tokenized by replacing the primary account identifier with a substitute number that may be associated with the payment account identifier. Further, tokenization may be applied to any other information which may be replaced with a substitute value (i.e., a card verification value (CVV)).

"Token exchange" or "de-tokenization" is a process of restoring the data that was substituted during tokenization. For example, a token exchange may include replacing a payment token with an associated primary account number (PAN) that was associated with the payment token during tokenization of the PAN. Further, de-tokenization or token exchange may be applied to any other information. In some embodiments, token exchange may be achieved via a transactional message, such as an ISO message, an application programming interface (API), or another type of web interface (e.g., web request).

"Authentication" is a process by which the credential of an endpoint can be verified to ensure that the endpoint is who they are declared to be.

A "requestor" may be an entity that can request an item or action. For example, a requestor can request registration with a network token system, request token generation, token activation, token de-activation, token exchange, other token lifecycle management related processes, and/or any other token related processes. A requestor may interface with a network token system through any suitable communication networks and/or protocols (e.g., using HTTPS, SOAP and/or an XML interface). Some non-limiting examples of a requestor may include third party wallet providers, issuers, acquirers, merchants, and/or payment processing networks. A requestor may be referred to as a token requestor when requesting generation of a new token or requesting a new use of an existing token from a network token system. In some embodiments, a token requestor can request tokens for multiple domains and/or channels. Token requestors may include, for example, card-on-file merchants, acquirers, acquirer processors, and payment gateways acting on behalf of merchants, payment enables (e.g., original equipment manufacturers, mobile network operators, etc.), digital wallet providers, and/or card issuers.

The term "server computer" may include a powerful computer or cluster of computers. For example, the server computer can be a large mainframe, a minicomputer cluster, or a group of servers functioning as a unit. In one example, the server computer may be a database server coupled to a Web server. The server computer may be coupled to a database and may include any hardware, software, other logic, or combination of the preceding for servicing the requests from one or more client computers. The server computer may comprise one or more computational apparatuses and may use any of a variety of computing structures, arrangements, and compilations for servicing the requests from one or more client computers. In some embodiments, the server computer may provide and/or support payment network cloud service.

An "authorization platform" (i.e. an "issuer") may be a system that can authorize a transaction.

A "merchant" is typically an entity that engages in transactions and can sell goods or services, or provide access to goods or services.

FIG. 1 shows a diagram providing an overview of the various roles involved in a token ecosystem, in accordance with some embodiments of the invention. The token ecosystem 100 comprises a token vault 110 which may be in communication with one or more of a token requestor 115, a merchant 130, an acquirer 135, a payment processing network 140, and an authorization platform 150 (i.e. issuer). The consumer 120 (i.e. user) may be in communication with the token requestor 115, the authorization platform 150, and the merchant 130. Any one of the consumer 120, the authorization platform 150, the merchant 130, the acquirer 135 or the payment network 140 may be the token requestor.

Furthermore, the merchant 120, the acquirer 130, the payment processing network 140, the authorization platform 150, and a token network 145 may all be in operative communication with each other (i.e., one or more communication channels may exist between each of the entities, whether or not these channels are used in conducting a financial transaction). In some embodiments, one or more of the entities or functionalities may be implemented via a cloud based payment (CBP) service. For example, a CBP service may provide token vault 110 functionality and/or token network 145 functionality. In addition, the payment network 140 may be implemented via a server computer providing a cloud based payment service.

The token vault 110 may be associated with the payment processing network 140, the authorization platform 150, the acquirer 135, or the merchant 130. For example, in some embodiments, a token service provider may comprise an associated token vault 110 and payment processing network 140. The token vault 110 may be able to receive a token request from the token requestor 115. The token vault 110 may be able to issue a token that can be used as surrogate payment account information, and a status of the token may depend on information provided in the token request. For example, in some embodiments, the token may be valid for a certain token domain and may have a certain token assurance level. The token vault 110 may store a record of the token, a token assurance level, a token status, a token expiration date, associated payment account information, token domain information, or any other suitable information.

The token vault 110 may also allow the token requestor 115 to register at the token vault 110. The token vault 110 may receive a request to register from the token requestor 115. The request may include information about the token requestor 115, information about how tokens will be used, a desired token assurance level, or any other suitable information. The token vault 110 may approve or reject the registration request.

The token vault 110 may also be capable of de-tokenizing and providing payment account information in response to receiving a token. For example, the token vault 110 may receive a request for payment account information from the payment processing network 140, authorization platform 150, acquirer 135, and/or merchant 130. The request may include a token. The token vault 110 may locate a token record and identify the payment account information that is associated with the token. The token vault 110 may provide the payment account information to the de-tokenization requestor.

In some embodiments, the de-tokenization requestor may be the payment processing network 140, which may request the payment account information for authorization purposes. In some embodiments, the de-tokenization requestor may be the merchant 130 which may wish to have the payment account information for consumer identification purposes.

The token requestor 115 may request a token on behalf of the consumer 120. The token requestor 115 may be a digital wallet provider, a merchant 130, a payment processing network 140, a token aggregator, or any other suitable entity. A token requestor 115 may have a business relationship with a merchant 130 and/or acquirer 135. The consumer 120 may wish to purchase a good and/or service from the merchant 130, and the token requestor 115 may retrieve a token from the token vault 110 for the consumer 120 to use for the purchase.

In some embodiments, the token requestor 115 may be a token aggregator. For example, the token aggregator may request tokens on behalf of one or more digital wallet providers. A digital wallet provider may prefer not to register with a token vault 110 and instead receive tokens from the token aggregator. Digital wallet providers may receive tokens from a token aggregator and then provide the tokens to consumers 110 that use a digital wallet. In some embodiments, a token requestor 115 may be able to request and collect tokens from multiple token vaults 110 or token service providers, and may request tokens that are valid for multiple payment processing networks 140. The token requestor 115 may register with each token vault 110 separately.

The merchant 130 may be capable to sell goods and/or services to the consumer 120. The merchant 130 may receive payment information comprising a token from the consumer 120. The merchant 130 may send the token to the acquirer 135 for payment authorization.

The acquirer 135 may be associated with the merchant 130, and may manage authorization requests on behalf of the merchant 120. The acquirer 130 may receive an authorization request message from the merchant 130 and send the authorization request message to a payment processing network 140. The payment processing network 140 may be associated with the token and may be identified by one or more fields within the token The payment processing network 140 may be disposed between the acquirer 130 and the authorization platform 150. The payment processing network 140 may include data processing subsystems, networks, and operations used to support and deliver authorization services, exception file services, and clearing and settlement services. For example, the payment processing network 140 may comprise a server computer, coupled to a network interface (e.g. by an external communication interface), and a database(s) of information. The server computer may provide cloud based payment services for the payment processing network 140. An exemplary payment processing network may include VisaNet™. Payment processing networks such as VisaNet™ are able to process credit card transactions, debit card transactions, and other types of commercial transactions. VisaNet™, in particular, includes a VIP (Visa Integrated Payments) system which processes authorization requests and a Base II system which performs clearing and settlement services. The payment processing network 140 may use any suitable wired or wireless network, including the Internet.

The payment processing network 140 may be capable to de-tokenize an authorization request message. For example, the payment processing network 140 may receive an authorization request message including a token, send the token to the token vault 110, receive associated payment account information from the token vault 110, and forward the authorization request message to the authorization platform 150 with the payment account information.

The authorization platform 150 may manage a payment account of the consumer 120. The authorization platform 150 may be able authorize transactions that involve the payment account.

A typical token transaction flow is described next. The consumer 120 may provide a PAN to the token requestor 115 to request a token for a transaction. For example, the consumer 120 can access an application, a mobile application or a website on the consumer device to interact with the token requestor 115. In some embodiments, the consumer 120 participates in a cardholder verification and authentication (ID&V) process using one or more authentication schemes to utilize the network token services. The token requestor 115 may communicate with the token vault 110 to request an exchange of the PAN with a token. The token vault 110 may provide a token as a substitute for the PAN. The token requestor 115 may provide the token to the consumer 120 for the transaction. In one embodiment, if the token is a static token, the token may be stored in a secure location on the consumer device, e.g., a secure element of the mobile device.

For conducting a transaction using the token, the consumer 120 may provide the token to the merchant computer 130. In one embodiment, the token may be presented as part of the transaction using any suitable token presentment mode such as contactless, ecommerce, stream/proximity (e.g., optical, sound, etc.), etc. For example, the token requestor 115 may provide the token in the form of a QR code that may be displayed on the consumer device 120. A merchant can scan the QR code including the payment token into the merchant computer 130. Alternatively, the consumer 120 can wave the consumer device in the vicinity of a contactless reader coupled to the merchant computer 130 to transfer the payment token in the contactless mode. In some embodiments, if the token requestor 115 is a payment enabler (e.g., a digital wallet provider), the token requestor 115 can orchestrate the population of the token requestor identifier into a transaction message before passing it to the merchant computer 130.

The merchant computer 130 may provide an authorization request message including the token to the acquirer computer 135 for the transaction initiated by the consumer 120. For example, in some embodiments, the authorization request message may include some token based values such as a token value, a token requestor identifier, an assurance level code in addition to some PAN based values. The acquirer computer 135 may forward the authorization request message including the token to the payment processing network computer 140. The payment processing network computer 140 may provide the token to the token network system 145 to receive a PAN in exchange.

The token network system 145 may provide the PAN to the payment processing network computer 140. The payment processing network computer 140 may modify the authorization request message to include the PAN in place of the token and provide the modified authorization request message to the authorization platform 150. The authorization platform 150 may provide an authorization response message to the payment processing network computer 140. For example, the authorization platform 150 may determine if the transaction can be authorized based on the consumer account information (e.g., available balance, transaction history, etc.).

The payment processing network computer 140 may modify the authorization response message received from the authorization platform 150 to replace the PAN information with the token information. For example, in one embodiment, the payment processing network computer 140 may interact with the token network system 145 to perform the PAN/token mapping. The payment processing network computer 140 may send the modified authorization response message including the token to the acquirer computer 135. The acquirer computer 135 may forward the modified authorization response message to the merchant computer 130. The merchant computer 135 may indicate the authorization response to the consumer 120. For example, the merchant computer 135 may send a message to the consumer device indicating if the transaction is approved or declined.

Upon understanding the typical transaction flow involving a token, as described above with respect to FIG. 1, one may appreciate the improvements in token handling described throughout this specification, below.

As provided above in connection with FIG. 1, based on a request from the token requestor 115, the token provider issues a token. According to various embodiments, the token may be assigned a status. For example, the token status may identify the token having a high assurance level indicating that the token is generated based on verified, authenticated user information. In some embodiments, the token status may identify the token having a low assurance level indicating that the token is generated based on insufficient or unreliable user information. A low assurance level token status may have restrictions imposed thereon. For example, the token associated with the low assurance level may be used for transactions up to a pre-determined amount (e.g. for transactions worth less than $50) or may only be used when accompanied by a user identification (e.g. presentment of the payment device, user ID, a PIN code and the like). Embodiments discussed below provide various techniques for determining the status of the token based on provided information. The status of the token determines how the token will be treated when presented for transactions.

Figure 2:
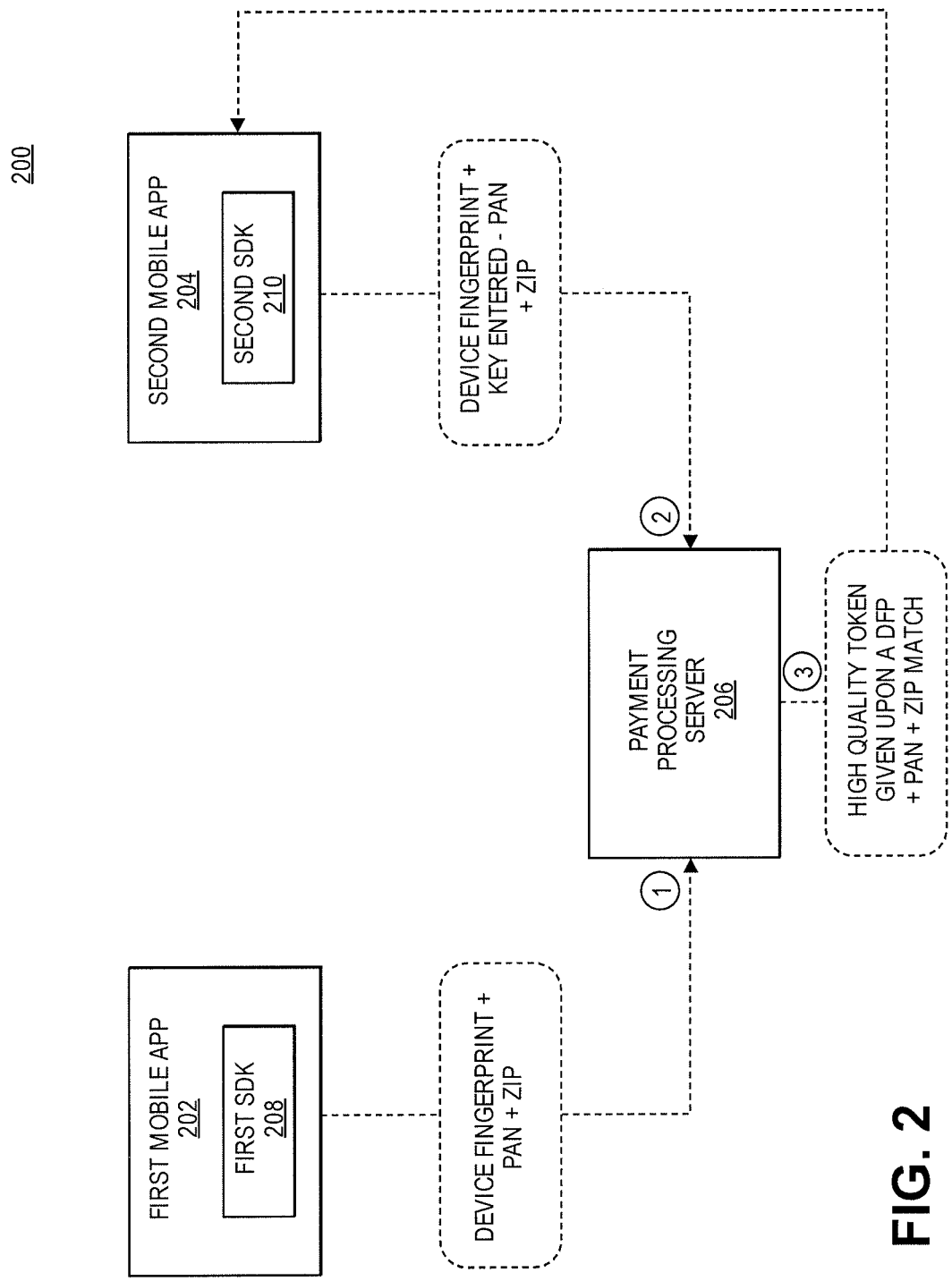
FIG. 2 shows a block diagram for implementing an exemplary token assurance method using device fingerprinting and authentication of user data, in accordance with some embodiments of the invention.

FIG. 2 shows a block diagram 200 for implementing an exemplary token assurance method using device fingerprinting and authentication of user data, in accordance with some embodiments of the invention. As illustrated in FIG. 2, a first mobile application (e.g. an issuer application) 202 and a second mobile application (e.g. a merchant application) 204 may be provisioned on a user device such that each mobile application may be used to conduct payment transactions using the user device. In some embodiments, both the first mobile application 202 and the second mobile application 204 may be executed by an operating system of the user device. For simplicity of illustration, the first mobile application and/or the second mobile application are illustrated in FIGS. 2-7. The mobile applications are provided on a mobile device, such as the applications 1012 provided on the mobile device 1002, illustrated in FIG. 10.

Additionally, the first mobile application 202 and the second mobile application 204 may be in communication via a payment processing server 206. The payment processing server 206 may support and/or provide cloud based payment (CBP) service capabilities. In some embodiments, the first mobile application 202 and the second mobile application 204 may be provisioned on the same user device. Alternatively, the first mobile application 202 may be provisioned on a first user device (e.g. a mobile phone) and the second mobile application 204 may be provisioned on a second user device (e.g. a tablet computer) such that the first user device and the second user device may be accessible via a common username and password.

The first mobile application 202 may be associated with an authorization entity (e.g. an issuer) and the second mobile application 204 may be associated with a merchant. That is, the first mobile application 202 may be a trusted application and the second mobile application 204 may be a untrusted application. The second mobile application 204 may allow users to enroll account information (e.g., payment card information) on their user devices through the second mobile application 204 that can be used to pay for purchases made at the merchant. The merchant may not validate the account of the user with an issuer before adding the payment account to the second mobile application 204. As such, the second mobile application 204 is "untrusted" because the account credentials associated with the second mobile application 204 has not been validated by the authorizing entity. These account credentials may be categorized as "untrusted accounts" when added through the second mobile application 204 and may have additional access restrictions than trusted accounts (i.e., issuer validated accounts).

Further, the authorization entity may incorporate a software development kit (SDK) 208 associated with the payment processing server 206 in the first mobile application 202. Similarly, the merchant may incorporate a second SDK 210 associated with the payment processing server 206 in the second mobile application 204. The SDKs 208 and 210 may enable the first mobile application 202 and the second mobile application 204, respectively, to properly communicate with the payment processing server 206.

The user may log into the first mobile application 202 using his/her user credentials associated with the authorization entity. Upon successful login to the first mobile application 202, the first SDK 208 may use a device identifier associated with the user device or generate a device fingerprint unique to the user device that can later be used to verify the user device. Data used to generate the device fingerprint may include, but is not limited to, a unique identifier assigned by the operating system, an International Mobile Station Equipment Identity (IMEI) number, OS version, plug-in version, etc. It can be appreciated that the data used to generate the device fingerprint may not require any active participation from the user, aside from successfully logging into the first mobile application 202. The first mobile application 202 may send, via the first SDK 208, a first set of user information to the payment processing server 206 (step 1). For example, the first set of user information may include the generated device fingerprint and data associated with a user account including, for example, a primary account number (PAN), zip code, a cardholder verification value (CVV2), and the like. In some embodiments, the payment processing server 206 may access a database to make sure that the received device fingerprint is not among blacklisted device fingerprints associated with devices known to have been used for fraudulent transactions.

Upon receiving the first set of user information and confirming that the user device has not been used for fraudulent transactions, the payment processing server 206 may register the user device and the first mobile application 202. The payment processing server 206 may generate a token and send it to the first mobile application 202. The token may have a status of a high quality token (i.e. the token may be associated with a high assurance level) indicating that the token is generated with a high level of trust due to the first mobile application 202 being associated with an authorizing entity.

After successful login with the first mobile application 202 and optional registration with the payment processing server 206, the user may download and open the second mobile application 204 on his/her user device. The second mobile application 204 may prompt the user to load his/her payment card information into the second mobile application 204. The user may proceed to enter account identifying information such as the account number, CVV2, zip code and/or any other identifying information into the second mobile application 204. The second mobile application 204 may then, via the second SDK 210, transmit a second set of user information to the payment processing server 206 (step 2). The second set of user information may include the user entered account identifying information and a device identifier or a device fingerprint generated by the second SDK 210. Data used to generate the device fingerprint may include, but is not limited to, a unique identifier assigned by the operating system, an International Mobile Station Equipment Identity (IMEI) number, OS version, plug-in version, etc. It can be appreciated that the data used to generate the device fingerprint may not require any active participation from the user, aside from providing the account identifying information to the second mobile application 204.

The payment processing server 206 may verify whether the account information provided by the user through the second mobile application 204 has previously been provisioned to the payment processing server 206 by the authorization entity. Additionally, the payment processing server 206 may determine whether the device fingerprint provided by the first mobile application 202 matches the device fingerprint provided by the second mobile application 204. A token with an assurance level may be generated based upon how well the first set of user information and the second set of user information correlate. The assurance level may be indicative of an amount of confidence that the user attempting to load the payment card is the genuine user and that the user device where the payment card is being loaded onto is the genuine user device used by the user.

A token associated with the account number may then be provisioned for the second mobile application 206 (step 3). The token may have a status based on the confidence level (or level of trust). For example, a token with a high assurance level may be provisioned if a high confidence level exists (e.g. all or most of the user information provided by the second mobile application 204 matches the user information provided by the first mobile application 202). Conversely, a token with a low assurance level may be provisioned if a low confidence level exists (e.g. some of the user information provided by the second mobile application 204 matches the user information provided by the first mobile application 202). The status of the token (i.e. assurance level associated with the token) may determine the amount of restrictions imposed on the token and treatment of the token. For example, a token with a low assurance level may have more restrictions than a token with a high assurance level. When using the token with the low assurance level, the user (via a mobile application) may be asked for additional identification (e.g. provide identifying information and/or PIN, CVV2, user biometrics) or may only be allowed a predetermined transaction amount (e.g. token with the low assurance level may be used for transactions worth less than $50). In some embodiments, if none or only a small portion of the user information provided by the second mobile application 204 matches the user information provided by the first mobile application 202, no token may be provided to the second mobile application 204.

In some embodiments, the token sent to (i.e. provisioned on) the first mobile application 202 may be the same as the token sent to the second mobile application 204. Alternatively, a first token may be sent to (i.e. provisioned on) the first mobile application 202 and a second, different, token may be sent to the second mobile application 204. The first token and the second token may have different status associated with each of them.

The token assurance flow described above may be further explained via an illustrative example. A husband and a wife may share a payment account while they both own their own individual mobile devices. The husband may have completed registration as described above and the merchant mobile application running on his mobile device may have been provisioned with a high assurance level token (e.g. the status of the token indicates that the token is a trusted token). The wife may download a mobile application to her mobile device and attempt to enroll the same PAN on her mobile device. However, the device fingerprint obtained from her mobile device may not match the device fingerprint originally obtained from the husband's device at the time of registration because the wife is using a different mobile device. However, the PAN and other card data (e.g., CVV2, zip code, etc.) may match. As a result, a token may still be provisioned for the wife's device but the token may be a low assurance level token (e.g. the status of the token indicates that the token is an untrusted token).

It can be appreciated that the provisioned token may be a static token or may be a dynamic token that may only be used a predetermined number of times before provisioning of a new token is required. If a new token needs to be provisioned, the registration process may need to be completed again and an updated device fingerprint may be provided to the payment processing server 206. In some embodiments, the device fingerprint may also change due to changes on the mobile device (e.g., OS upgrade, etc.). In such instances, the registration process may need to be completed again. In some embodiments, the provisioned token may be used for use with NFC payments or other contactless payments (e.g., QR code payments).

Figure 3:
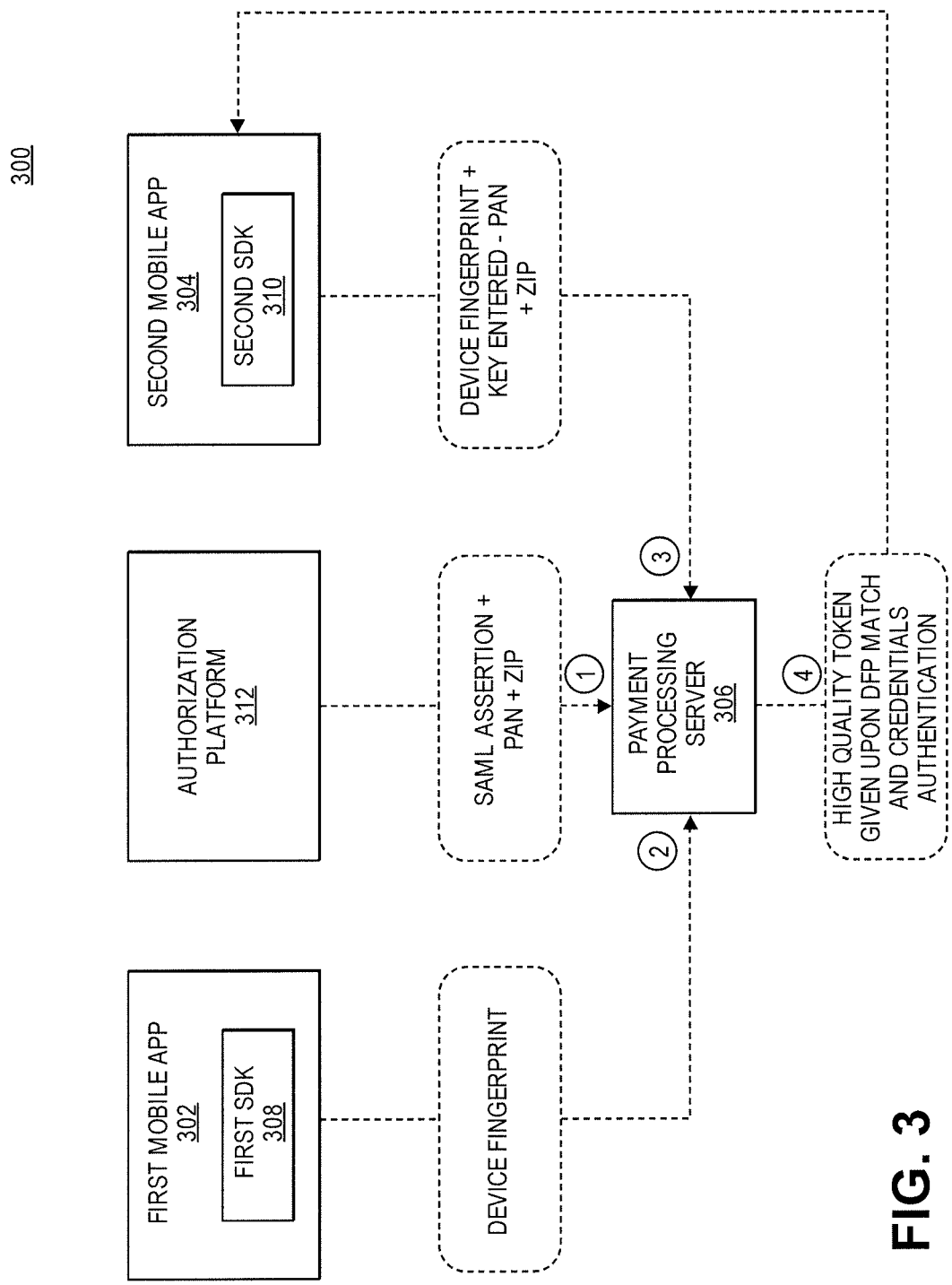
FIG. 3 shows a block diagram for implementing an exemplary token assurance method using device fingerprinting and authorization platform provided information of user data, in accordance with some embodiments of the invention.

In some embodiments, the authorization platform may be in direct communication with the payment service provider server. FIG. 3 illustrates such an embodiment.

FIG. 3 is a block diagram 300 for implementing an exemplary token assurance method using device fingerprinting and authorization platform provided information of user data, in accordance with some embodiments of the invention. In the embodiment illustrated in FIG. 3, the authorization platform 312 may actively provision user data into the payment processing server 306, for example, when the user enrolls for online banking service with the authorization platform 312. This provisioning may occur for a number of user devices. In some embodiments, the authorization platform 312 may provision the user information (e.g., PAN, zip code, address, etc.) into a digital payment service account from within their online banking service. The user may then establish a user name and password to subsequently conduct online transactions. During this process, the authorization platform 312 may also provide an identity assertion in the form of a Security Assertion Markup Language (SAML) assertion to the payment processing server 306 (step 1). The identity assertion may indicate that the user's identity has been verified and authenticated by the authorization platform 312.

The user may then log into the first mobile application 302, as described above with respect to FIG. 2. In some embodiments, the first mobile application 302 (e.g. issuer application) may generate an identity assertion upon the user identifying themselves to the first mobile application 302. The first SDK 308 may also generate a device fingerprint. The first mobile application 302 may send the first set of user information including at least the device fingerprint and, if generated, the identity assertion (e.g. SAML assertion), via the first SDK 308, to the payment processing server 306 (step 2). In some embodiments, the user data may have already been provided to the payment processing server 306 through the provisioning service.

When the user activates the second mobile application 304, he/she may be prompted to load a new payment card into the second mobile application 304. However, instead of typing the payment card number, the user may choose to load a payment card via the digital payment service associated with the payment processing server 306. Accordingly, the user may enter his/her username and password into the digital payment service portal. The second SDK 310 within the second mobile application 304 may send the login credentials along with a device fingerprint (generated by the second SDK 310) to the payment processing server 306

(step 3). Based upon a successful match of the account login and strong correlation of the user information (including the device fingerprints, user data, identity assertion) received from the first mobile application 302, the second mobile application 304 and the authorization platform 312, the payment processing server 306 may provision a token to the second mobile application 304 (step 4).

In other words, the embodiment shown in FIG. 3 illustrates the authorization platform 312 providing an identity assertion (i.e. SAML assertion) for the user to the payment processing server 306. The payment processing server 306 may then issue a token with a high assurance level based on the identity assertion because the authorization platform 312 is a trusted entity. The identity assertion may be based on the user's successful login to the first mobile application 302 using the same credentials that he/she uses for online banking. The provisioning of the token may be based on a correlation between the data received from the second mobile application 304 with data received from the first mobile application 302 and information previously received from the authorization platform 312.

Figure 4:
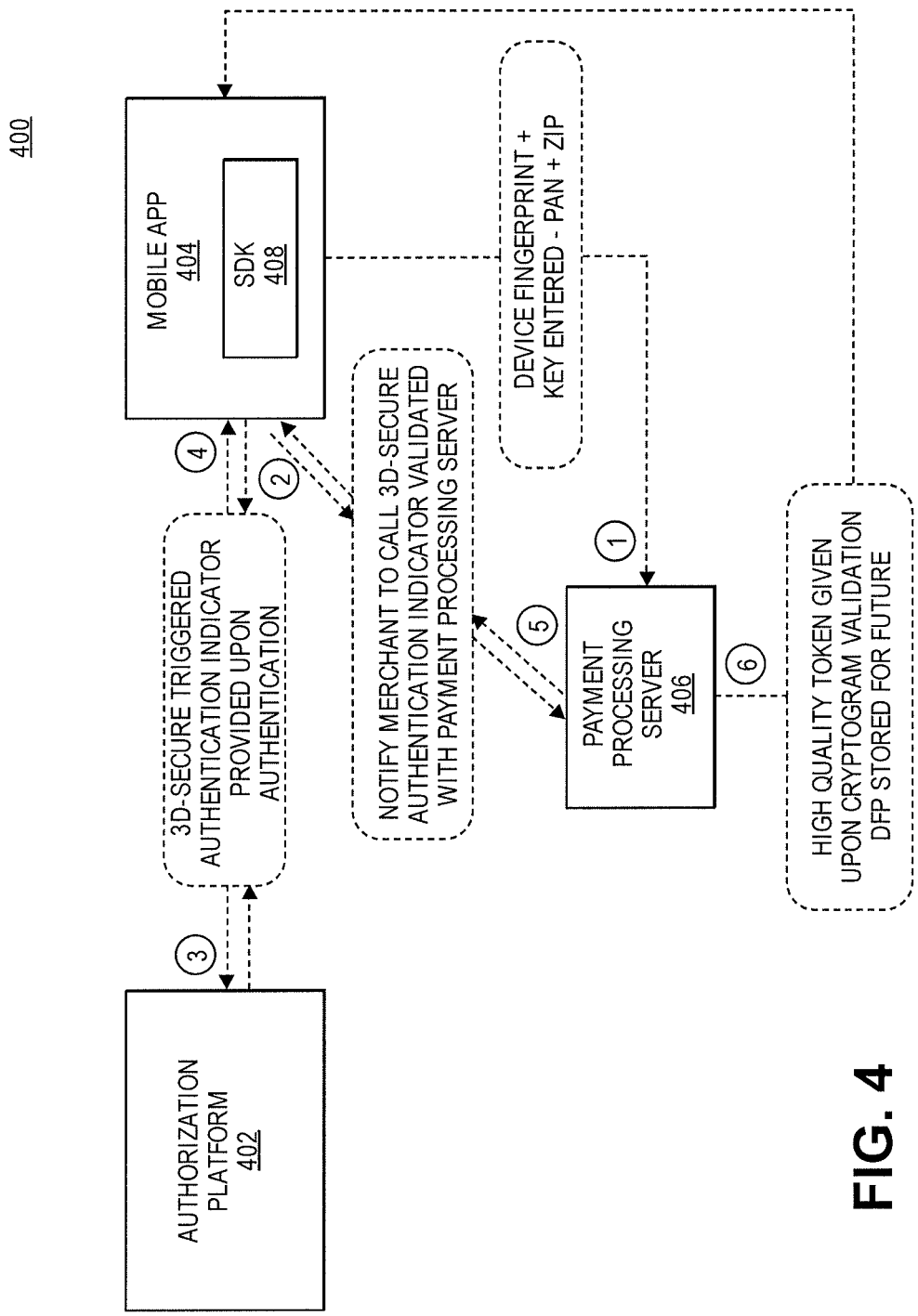
FIG. 4 shows a block diagram for implementing an exemplary token assurance method using an XML-based security layer to authenticate a new device, in accordance with some embodiments of the invention.

In some embodiments, the token assurance method may not include a first mobile application provisioned by the authorization platform. That is, the user device may not have the issuer mobile application. FIG. 4 illustrates such an embodiment.

FIG. 4 a block diagram 400 for implementing an exemplary token assurance method using an XML-based security layer to authenticate a new user device, in accordance with some embodiments of the invention. When the user downloads and activates the mobile application 404 (e.g. merchant mobile application), the user may be prompted to load new payment account information to the mobile application 404. As described above, the mobile application 404 may have an SDK 408. The SDK 408 may send a first set of user information including the payment account number, user identifying information and a device fingerprint (generated by the SDK 408) to the payment processing server 406 for requesting a token corresponding to the payment account number (step 1). The payment processing server 406 may detect a new user who has not previously registered with the payment processing server 406. Given the lack of any prior device information, the payment processing server 406 may not automatically validate the information provided by the merchant application 404 in order to provision a token. The payment processing server 406 may try to locate other supporting authentication mechanisms.

For example, the payment processing server 406 may detect that the authorization platform 402 supports an XML-based security layer authentication (e.g., 3-D Secure) and may send a prompt to the mobile application 404 requesting the mobile application 404 to perform the XML-based security layer authentication process with the authorization platform 402 (step 2). The SDK 408 of the mobile application 404 may include an embedded merchant plug-in that triggers the XML-based security layer authentication process (step 3). Upon successful authentication with the XML-based security layer of the authorization platform 402, the authorization platform 402 may provide an authentication indicator (e.g. cardholder authentication verification value (CAVV)) to the SDK 408 inside the mobile application 404 (step 4). The SDK 408 may then pass the authentication indicator to the payment processing server 406 (step 5). The payment processing server 406 may validate the authentication indicator. For example, the payment processing server 406 may pass the authentication indicator to an interoperability domain supporting the XML-based security layer authentication for validation. Upon validation of the authentication indicator, the payment processing server 406 may provision a token with a high assurance level to the mobile application 404 (step 6). The payment processing server 406 may store the device fingerprint for future authentication/verification processes. In some embodiments, the payment processing server 406 may use the device fingerprint to ensure that the token and/or the payment account is not affiliated with too many user devices. For example, using the fingerprints of user devices, the payment processing server 406 may determine that a given token and/or payment account is affiliated with a couple of user devices (e.g. user mobile phone, user tablet computer, user laptop), which may be acceptable. However, if the same token and/or payment account are affiliated with too many devices (e.g. 10 devices) or the same device (i.e. same fingerprint) is affiliated with too many payment accounts, the payment processing server 406 may start an inquiry regarding whether fraudulent activity is taking place. If there is suspected fraud, the payment processing server 406 may decrease the status of the token (i.e. drop the assurance level associated with the token) or destroy (e.g. cancel, terminate, deactivate) the token.

It can be appreciated that while the XML-based security layer authentication (e.g. 3-D secure authentication) is typically used for e-commerce transactions and is performed each time a transaction is conducted, the use of the XML-based security layer authentication to authenticate a user prior to provisioning a token can provide certain benefits over existing solutions. Such benefits include using the same device and the high assurance level token in future transactions without having to perform validation and/or authentication processes for each transaction.

Figure 5A:
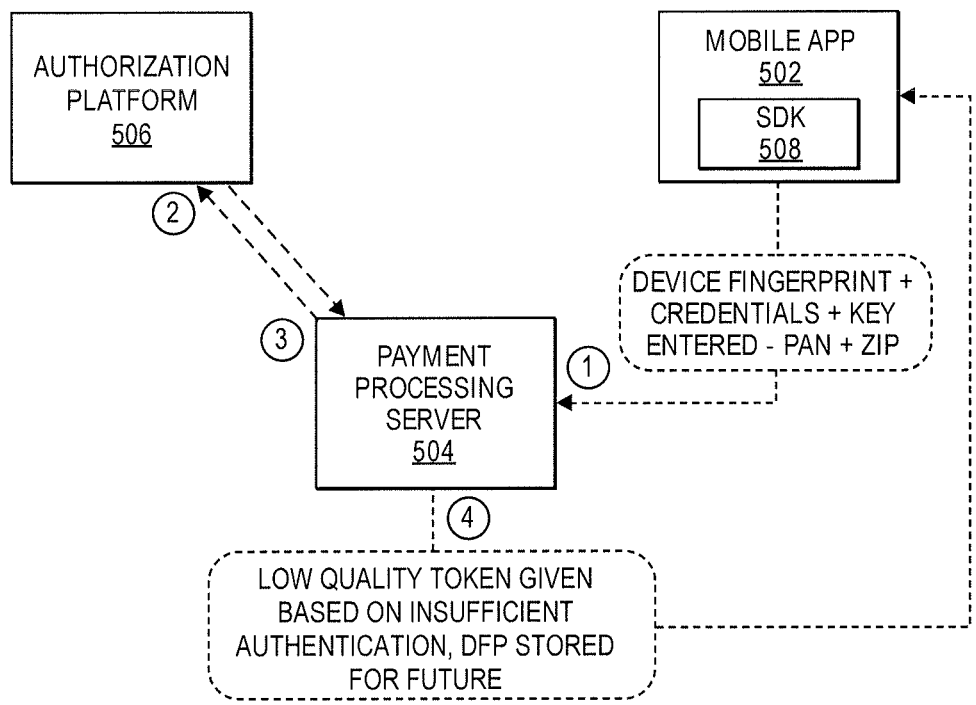
FIG. 5A shows a block diagram for implementing an exemplary token assurance method that uses authentication based on parameters configured by the authorization platform, in accordance with some embodiments of the invention.

In some embodiments, the token assurance method may not include a first mobile application provisioned by the authorization platform. That is, the user device may not have the issuer mobile application. In addition, the payment processing server may not have access to any of the authorization processes discussed above. Instead, the payment processing server may rely upon authentication based on parameters configured by the authorization platform. FIG. 5A illustrates such an embodiment.

FIG. 5A shows a block diagram 500 for implementing an exemplary token assurance method that uses authentication based on parameters configured by the authorization platform, in accordance with some embodiments of the invention. In the exemplary embodiment illustrated in FIG. 5A, the authorization platform 506 may have previously set parameters within their own systems or within the payment processing server 504 to determine when to issue a token and/or what kind (i.e. status) of token to issue. Exemplary parameters may include, but are not limited to, the age of payment account on user device, the transaction count without chargebacks or lost/stolen status performed using the payment account on the user device, the transaction volume without chargebacks or lost/stolen status performed using the payment account on the user device, a risk score, the number of devices the payment account is associated with and the like). When the user downloads and executes the mobile application 502 (e.g. a merchant mobile application), the user may be prompted to load payment account information to the mobile application 502. Upon receiving the user information (e.g. account number, expiration date, address, zip code, and the like), the SDK 508 embedded in the mobile application 502 may transmit this information to the payment processing server 504, along with additional credentials (e.g., account age, assurance levels from wallet provider, etc.) and a device fingerprint (generated by the SDK 508) (step 1). The payment processing server 504 may correlate this data along with other risk information, such as the number of devices the payment account has been loaded on, the number of transactions without a chargeback, and the like.

Based on this information, the authorization platform 506, or the payment processing server 504 on behalf of the authorization platform 506, may decide what type of token to return to the mobile application 502 (steps 2 and 3). Without sufficient authentication as configured by the authorization platform 506, a token with a low assurance level may be returned to the mobile application 502 (step 4). For example, the low assurance level token can be used for contactless transactions but may not provide the associated card present treatment. In subsequent transactions, the SDK 508 may continue to check with the payment processing server 504 to determine whether parameters are met in order to upgrade the token to a high assurance level token to receive the associated economic benefits and liability protection associated with such tokens.

The status of the token provided to the mobile application 502 may be upgraded from a low assurance level to a high assurance level once a predetermined criteria is met. For example, the status may be upgraded when a number of successful transactions are completed with the user device within a predetermined period of time. In some embodiments, the authorization platform 506 may determine these transaction history parameters. The payment processing server 504 may enforce the parameters on behalf of the authorization platform 506. The transaction history parameters may include, but is not limited to, account age on device, transaction count, transaction volume, risk score, maximum number of devices, a certain amount of total purchase value, and the like.

Figure 5B:
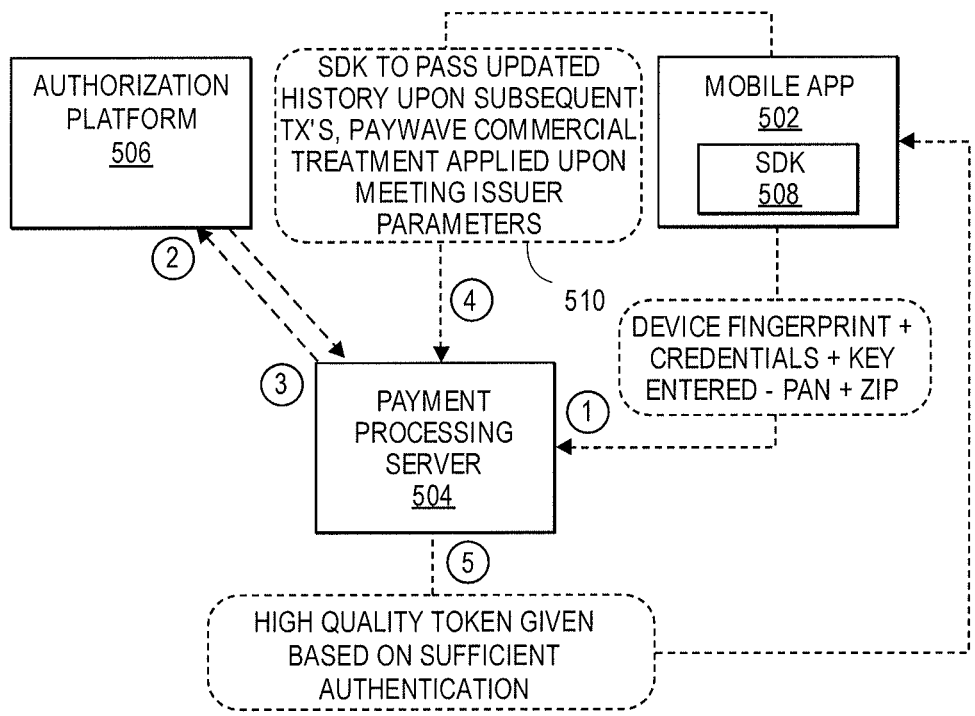
FIG. 5B shows a block diagram for modifying an assurance level associated a token based on the transaction history, in accordance with some embodiments of the invention.

FIG. 5B shows a block diagram 520 for modifying an assurance level associated a token based on the transaction history, in accordance with some embodiments of the invention. In FIG. 5B, the mobile application 502 is provisioned with a token having a low assurance level, as described above in connection with FIG. 5A. After being provisioned with the low assurance level token, the mobile application 502 provides transaction history updates 510 to the payment processing server 504 (step 4). In some embodiments, the mobile application 502 may send periodical updates (e.g. transaction history update messages) to the processing server 504 as transactions are completed. In other embodiments, the mobile application 502 may send transaction updates to the payment processing server 504 when the predetermined criteria (i.e. criteria determined by the authorization platform 506) is met. Upon satisfying the predetermined criteria, the payment processing server 504 may upgrade the status of the token previously sent to the mobile application 502 (step 5).

Accordingly, in the exemplary embodiment illustrated in FIGS. 5A-5B, the payment processing server 504 may monitor the paring between the user device and a PAN over time. Based on the transaction history received from the mobile application 502, the payment processing server 504 may determine that the same PAN is being used by the same mobile application 502 on a same user device. Specifically, the payment processing server 504 may determine that the same user device is being used based on the device fingerprint provided in the transaction history matching the device fingerprint initially provided by the mobile application 502, as discussed above in connection with FIG. 5A. Thus, the payment processing server 504 may determine that the PAN is being used legitimately and upgrade the status of the token provided to the mobile application 502. In some embodiments, the payment processing server 504 may also consider history of transactions conducted using other mobile applications on the same user device.

According to various embodiments, the token assurance method may not include a first mobile application provisioned by the authorization platform. That is, the user device may not have the issuer mobile application. In addition, the payment processing server may not interact with the authorization platform, as described above. Instead, the payment processing server may rely upon authentication based on reliable data obtained by the mobile application, for example at a merchant location. In some embodiments, the reliable data may include a cryptogram (illustrated in FIG. 6) associated with a payment card received from a mobile application or a unique code (illustrated in FIG. 7) provided to the user at the merchant location and received from the mobile application.

Figure 6:
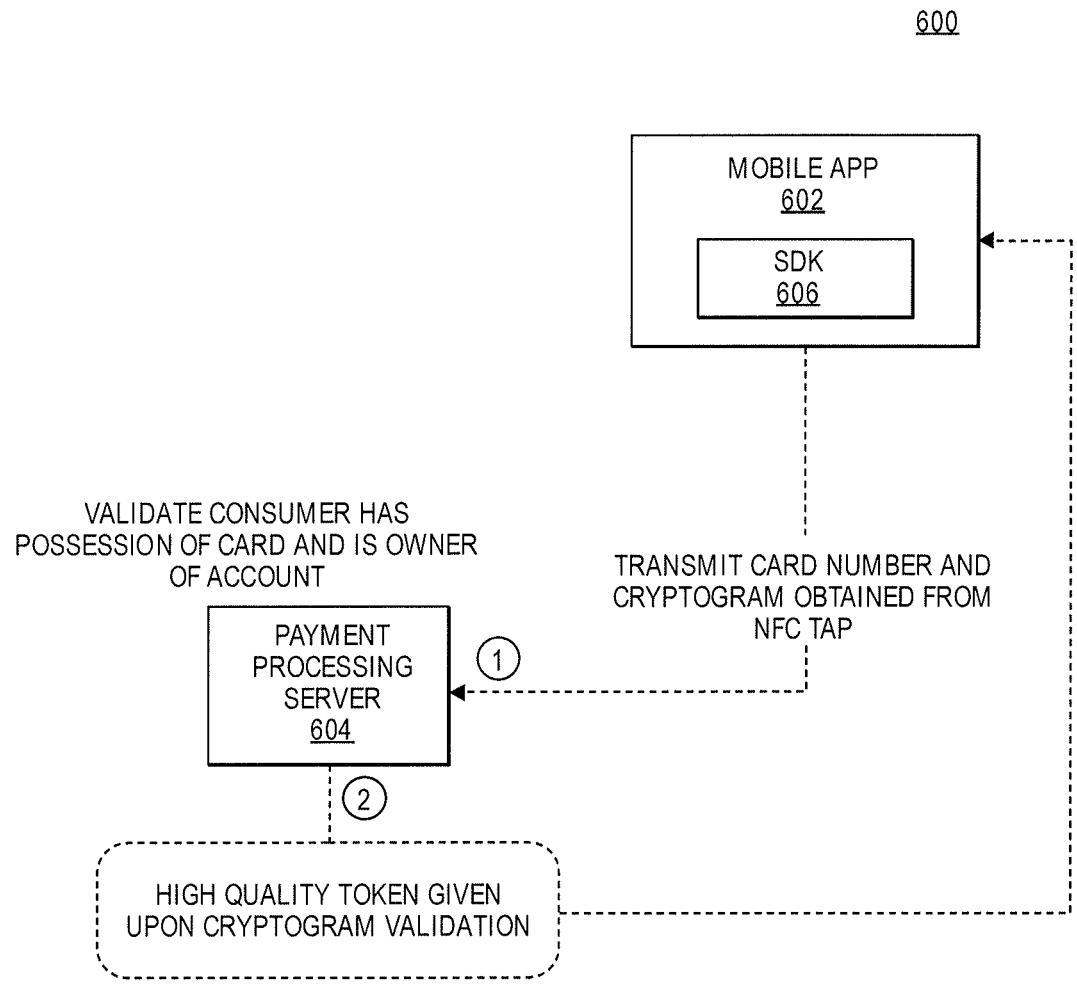
FIG. 6 shows a block diagram for implementing an exemplary token assurance method that uses data obtained from a near field communication (NFC) interaction at a merchant location, in accordance with some embodiments of the invention.

FIG. 6 shows a block diagram 600 for implementing an exemplary token assurance method that uses data obtained from a near field communication (NFC) interaction at a merchant location, in accordance with some embodiments of the invention. An NFC chip in a mobile device may include both read and broadcast capabilities. Accordingly, the user may tap their payment card against their mobile device to transfer basic information such as the card number along with a unique cryptographic value that is unique to the payment card. The payment card information and the unique cryptographic value can be sent to the payment processing server 604 from the mobile application 602 (e.g. merchant mobile application), via the SDK 606 (step 1). The payment processing server 604 may verify the unique cryptographic value and authenticate the user (i.e. verify that the user has possession of the payment card and is the owner of the account because only the holder of the payment card may have access to the unique cryptographic value). Based on this verification, a token with a high assurance level can be provisioned for the mobile application 602 (step 2). In some cases, if the mobile device is the fifth or sixth mobile device for which the token associated with the account number is being requested, a token with a low assurance level may be provisioned for the mobile application 602.

Figure 7:
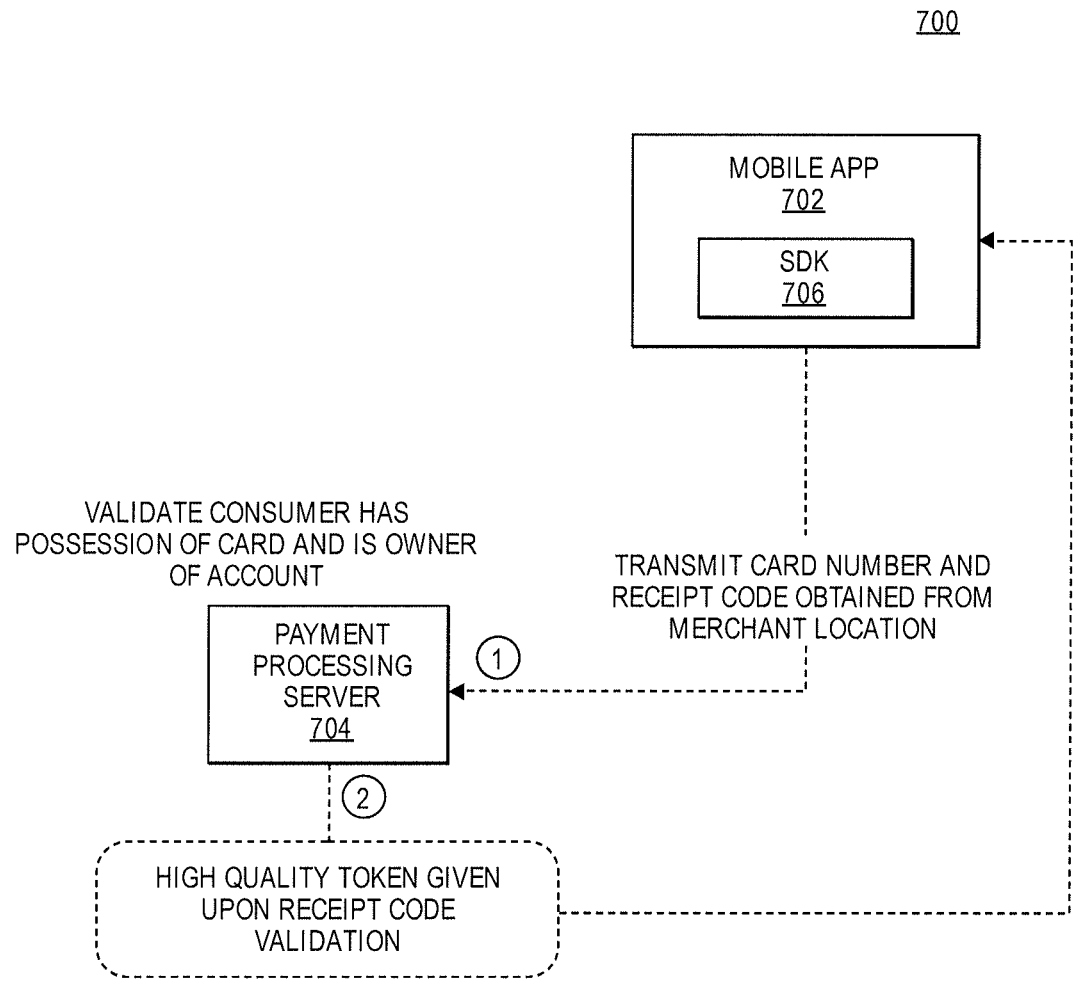
FIG. 7 shows a block diagram for implementing an exemplary token assurance method that uses a receipt code generated at a merchant location, in accordance with some embodiments of the invention.

FIG. 7 shows a block diagram 700 for implementing an exemplary token assurance method that uses a receipt code generated at a merchant location, in accordance with some embodiments of the invention. A user may carry out a traditional transaction at a merchant location using his/her payment card. Upon completion of the transaction, the user may be notified by the merchant to install the mobile application 702 (e.g. merchant mobile application) and register their payment card with the mobile application 702. For subsequent transactions with the merchant, the user may use their mobile device to pay at the merchant location. The mobile application 702 may request the payment card information from the user along with a unique receipt code. The unique receipt code may be printed on the receipt of the original traditional transaction carried out at the merchant location. The payment card information and the unique receipt code may then be passed on to payment processing server 704, via the SDK 706 embedded in the mobile application 702 (step 1). The receipt code may indicate that the user successfully completed a transaction at the merchant location, which implies that the user is in possession of the payment device and the merchant checked the user identification prior to approving the transaction. Thus, the receipt code is treated as a trusted piece of information. The payment processing server 704 may verify that the unique receipt code correlates with the payment card information, and may provision a high assurance level token to the mobile application 702 (step 2).

Figure 8:
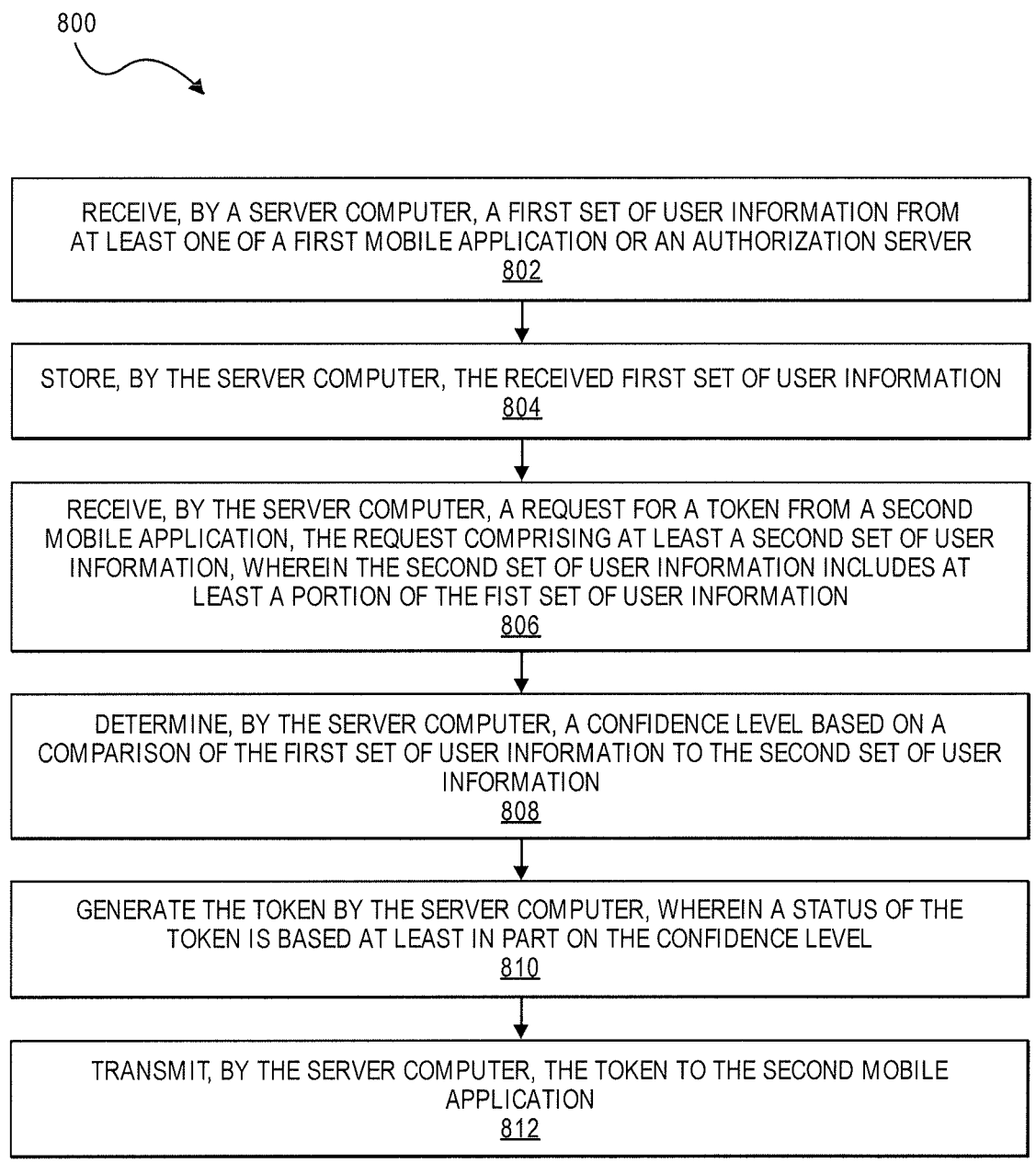
FIG. 8 is a flowchart of an exemplary method for generating a token with an assurance level based on information received at least from a mobile application, in accordance with some embodiments of the invention.

FIG. 8 is a flowchart of an exemplary method 800 for generating a token with an assurance level based on information received at least from a mobile application, in accordance with some embodiments of the invention. The method may be performed by a processor in a server computer. The method may include receiving, by the server computer, a first set of user information from at least one of a first mobile application or an authorizing server (step 802). The first mobile application may be installed/provisioned on a user device, such as a mobile phone of the user. In some embodiments, the authorizing server may have provisioned the first mobile application on the user mobile device. The first set of user information may include one or more of a device identifier, an account number, an address, a zip code, a name, a username, a telephone number or an identity assertion. The server computer may store the received first set of user information at a storage (step 804).

At step 806, the server computer may receive a request for a token from a second mobile application, the request comprising at least a second set of user information. The second mobile application may be installed/provisioned on a user device. In some embodiments, the first mobile application and the second mobile application may be provisioned on the same user device. Alternatively, the first mobile application and the second mobile application may be installed/provisioned on separate user devices accessible, for example, with a same username and password. The second mobile application may be a merchant application. The second set of user information may include at least a portion of the first set of user information. The second set of user information may include one or more of a device identifier, an account number, an address, a zip code, a name, a username, a telephone number, user credentials or a user authentication verification value.

The server computer may compare the first set of information with the second set of information. That is, the server computer may try to correlate the second set of information with the first set of information. At step 808, the server computer may determine a confidence level based on the comparison of the first set of user information to the second set of user information. At step 810, the server computer may generate a token. A status (e.g. an assurance level) of the token may be based at least in part on the confidence level. The status of the token may be may be indicative of a level of restriction associated with the token. At step 812, the server computer may transmit the generated token to the second mobile application.

In some embodiments, after receiving the token and performing one or more transactions with the token, the second mobile application may send a transaction history to the server computer. Based on the transaction history, the server computer may change the status of the token. For example, if a token with low assurance level is provided to the second mobile application, the status of the token may be increased to high assurance level based on at least the transaction history.

According to various embodiments, the first set of information may include an authentication indicator generated by the authorizing server, an identity assertion as part of the first set of user information or an indication of an XML-based security layer validation associated with a user of the second mobile application. The status of the token may be based at least in part in the received information.

In some embodiments, the authorization server may receive information from a single mobile application. That is, the token assurance method may not include a first mobile application provisioned by the authorization platform. In addition, the payment processing server may not interact with the authorization platform, as described above. Instead, the payment processing server may rely upon authentication based on reliable data obtained by the mobile application, for example at a merchant location. In some embodiments, the reliable data may include a cryptogram associated with a payment card received from a mobile application or a unique code provided to the user at the merchant location and received from the mobile application. A flowchart of an exemplary method for such embodiments is illustrated in FIG. 9.

Figure 9:
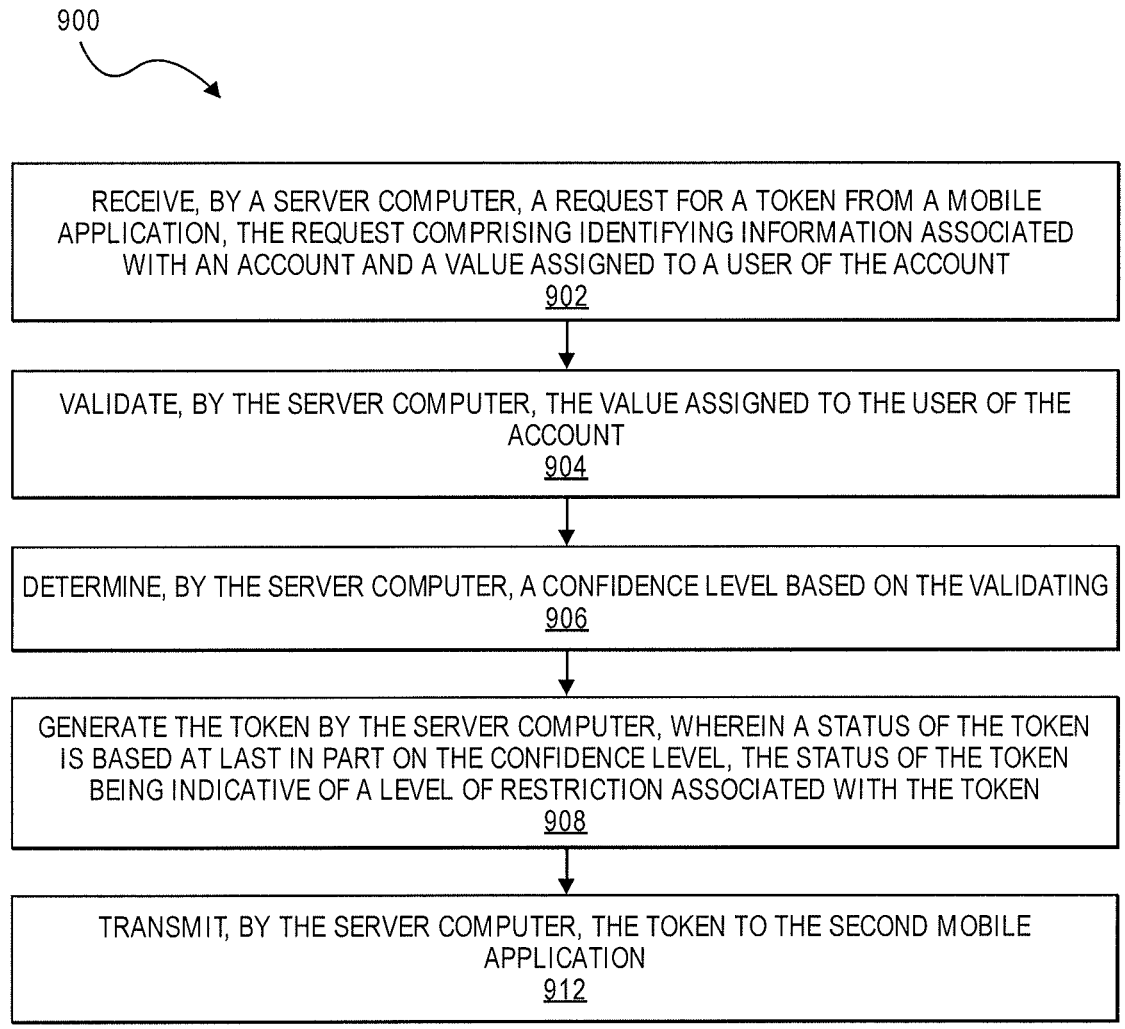
FIG. 9 is a flowchart of another exemplary method 900 for generating a token with an assurance level based on information received at least from a mobile application, in accordance with some embodiments of the invention.

FIG. 9 is a flowchart of another exemplary method 900 for generating a token with an assurance level based on information received at least from a mobile application, in accordance with some embodiments of the invention. The method may be performed by a processor in a server computer. The method may include receiving, by the server computer, a request for a token from a mobile application (step 902). The mobile application may be a merchant mobile application installed/provisioned on a user device. The request may include identifying information associated with an account and a value assigned to a user of the account. Upon receipt of the identifying information and the value, the server computer may validate the value assigned to the user of the account (step 904). The value assigned to the user may include a cryptogram assigned to a user device associated with the account. For example, the user device may be a payment card including a near field communications (NFC) chip. The cryptogram may be unique to the payment card and the account number associated with the payment card. In some embodiments, the value assigned to the user may include a receipt code associated with a prior transaction carried out using the account. For example, the user may complete a purchase at the merchant location. The merchant may provide the user a receipt with a unique receipt code.

At step 906, the server computer may determine a confidence level based on validating the value assigned to the user of the account. At step 908, the server computer may generate a token. A status (e.g. an assurance level) of the token may be based at least in part on the confidence level. The status of the token may be may be indicative of a level of restriction associated with the token. At step 910, the server computer may transmit the generated token to the second mobile application.

Embodiments discussed above provide the ability to accurately identify a consumer and bind the consumer identity to a user device and a payment instrument via a token. Particularly in environments where it is not possible to obtain a static or a unique device ID, the consumer may be authenticated using above-discussed methods and appropriate token may be generated. Embodiments generate tokens with varying quality or assurance levels based on the user information provided by the software application(s) running on the user device. According to various embodiments, the status of the token generated for a software application may be modified (e.g. upgraded) based on the transaction history provided by that software application.

Figure 10:
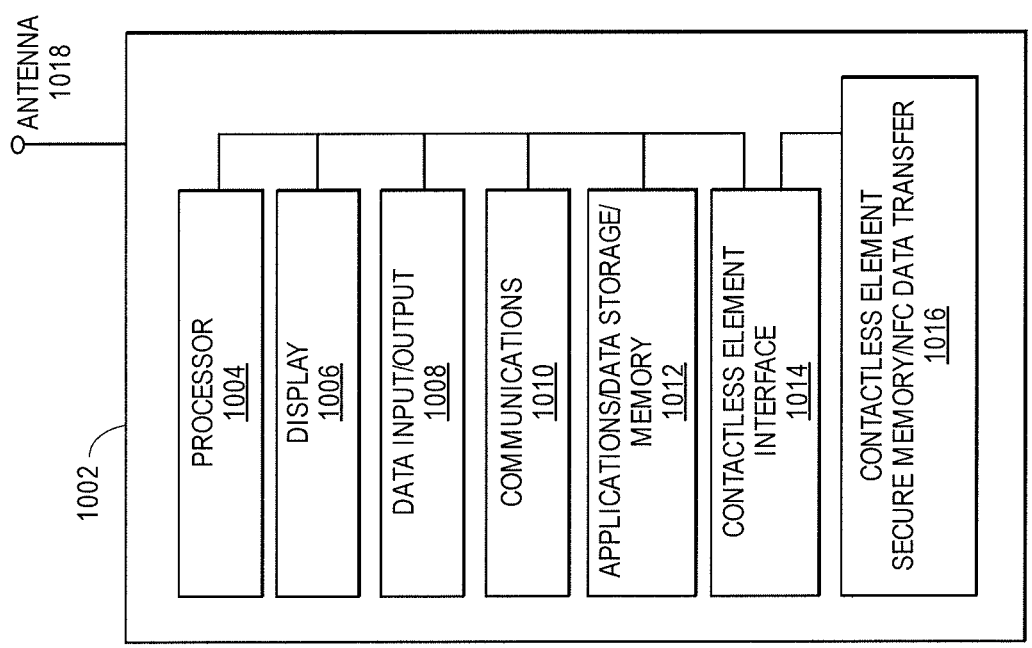
FIG. 10 illustrates a block diagram of a mobile device.

FIG. 10 is a functional block diagram illustrating a portable communication device 1002 that may be used to perform mobile banking operations, such as initiating transactions and receiving and displaying transaction alerts, in accordance with some embodiments of the present invention. Portable communication device 1002 may include circuitry that is used to enable certain device functions, such as telephony. The functional elements responsible for enabling those functions may include a processor 1004 that is programmed to execute instructions that implement the functions and operations of the device. Processor 1004 may access data storage 1012 (or another suitable memory region or element) to retrieve instructions or data used in executing the instructions. Data input/output elements 1008 may be used to enable a user to input data (via a microphone or keyboard, for example) or receive output data (via a speaker, for example). Display 1006 may also be used to output data to a user. Communications element 1010 may be used to enable data transfer between device 1002 and a wireless network (via antenna 1018, for example) to assist in enabling telephony and data transfer functions. Device 1002 may also include contactless element interface 1014 to enable data transfer between contactless element 1016 and other elements of the device, where contactless element 1016 may include a secure memory and a near field communications data transfer element (or another form of short range communications technology). As noted, a mobile phone or similar device is an example of a portable communication device that may be used to display alerts as described with reference to embodiments of the present invention. However, other forms or types of devices may be used without departing from the underlying concepts of the invention. Further, devices that are used to display alerts may not require the capability to communicate using a cellular network in order to be suitable for use with embodiments of the present invention.

Figure 11:
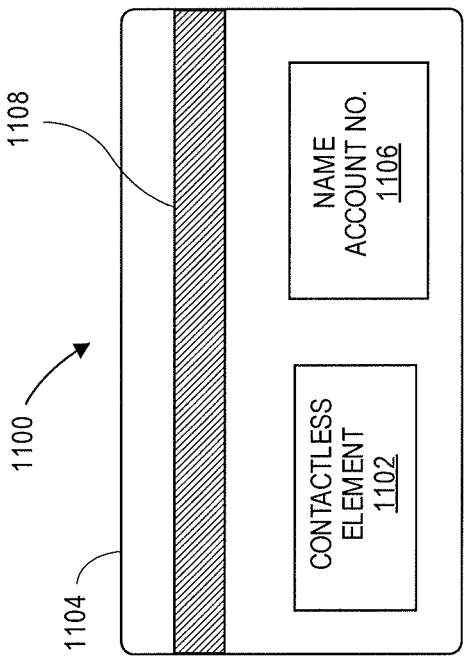
FIG. 11 illustrates a block diagram of a portable consumer device.

FIG. 11 is a diagram of a portable consumer device 1100 in the form of a card that includes a contactless payment element 1102, and that may be used to initiate a transaction, in accordance with some embodiments of the present invention. The payment device depicted in FIG. 11 may be a "smart card" or similar device, such as a credit or debit type card in which a chip is embedded. One form of such a device is known as an EMV (Europay™, MasterCard™ and Visa™) card. In the context of the present invention, EMV refers to a standard for interoperation of IC cards ("chip cards") and IC card capable POS terminals and ATMs, and is used for authenticating credit and debit card payments. The EMV standard defines the interactions at the physical, electrical, data and application levels between IC cards and IC card processing devices for use in financial transactions.

FIG. 11 shows a substrate 1104 that provides the form factor for device 1100. A contactless element 1102 for interfacing with a data access or data transfer device may be present on, or embedded within, substrate 1104. Contactless element 1102 may include a chip or other form of data storage element. Contactless element 1102 may include the capability to communicate and transfer data using a near field communications (NFC) technology or other short range communications technology. Consumer information 1106 such as an account number, expiration date, and consumer name may be printed or embossed on the card. Although not necessary for operation as a contactless payment device, device 1100 may include a magnetic stripe 1108 on substrate 1104, where magnetic stripe 1108 permits access to contactless element 1102. This may be used to provide access to data stored in, or the functions of, the chip that is part of the contactless element by a terminal using a magnetic stripe reader.

The various participants and elements described herein with reference to FIGS. 1-11 may operate one or more computer apparatuses to facilitate the functions described herein. Any of the elements in FIGS. 1-11, including any servers or databases, may use any suitable number of subsystems to facilitate the functions described herein.

Figure 12:
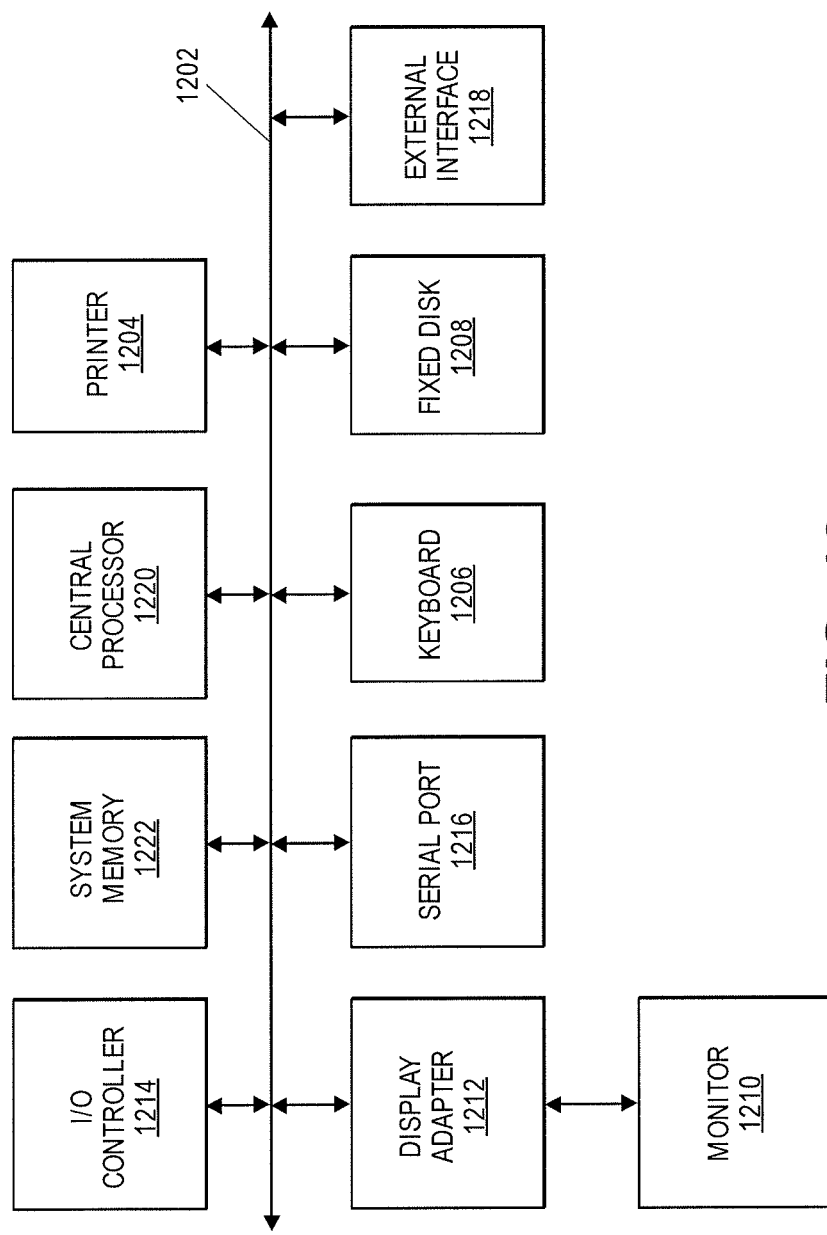
FIG. 12 illustrates a block diagram of a computer apparatus.

Examples of such subsystems or components are shown in FIG. 12. The subsystems shown in FIG. 12 are interconnected via a system bus 1202. Additional subsystems such as a printer 1204, keyboard 1206, fixed disk 1208 (or other memory comprising computer readable media), monitor 1210, which is coupled to display adapter 1212, and others are shown. Peripherals and input/output (I/O) devices, which couple to I/O controller 1214 (which can be a processor or other suitable controller), can be connected to the computer system by any number of means known in the art, such as serial port 1216. For example, serial port 1216 or external interface 1218 can be used to connect the computer apparatus to a wide area network such as the Internet, a mouse input device, or a scanner. The interconnection via system bus allows the central processor 1220 to communicate with each subsystem and to control the execution of instructions from system memory 1222 or the fixed disk 1208, as well as the exchange of information between subsystems. The system memory 1222 and/or the fixed disk 1208 may embody a computer readable medium.

Embodiments of the invention are not limited to the above-described embodiments. For example, although separate functional blocks are shown for an issuer, payment processing network, and acquirer, some entities perform all of these functions and may be included in embodiments of invention.

Specific details regarding some of the above-described aspects are provided above. The specific details of the specific aspects may be combined in any suitable manner without departing from the spirit and scope of embodiments of the invention. For example, back end processing, data analysis, data collection, and other transactions may all be combined in some embodiments of the invention. However, other embodiments of the invention may be directed to specific embodiments relating to each individual aspect, or specific combinations of these individual aspects.

It should be understood that the present invention as described above can be implemented in the form of control logic using computer software (stored in a tangible physical medium) in a modular or integrated manner. Based on the disclosure and teachings provided herein, a person of ordinary skill in the art may know and appreciate other ways and/or methods to implement the present invention using hardware and a combination of hardware and software.

Any of the software components or functions described in this application, may be implemented as software code to be executed by a processor using any suitable computer language such as, for example, Java, C++ or Perl using, for example, conventional or object-oriented techniques. The software code may be stored as a series of instructions, or commands on a computer readable medium, such as a random access memory (RAM), a read only memory (ROM), a magnetic medium such as a hard-drive or a floppy disk, or an optical medium such as a CD-ROM. Any such computer readable medium may reside on or within a single computational apparatus, and may be present on or within different computational apparatuses within a system or network.

The above description is illustrative and is not restrictive. Many variations of the invention may become apparent to those skilled in the art upon review of the disclosure. The scope of the invention should, therefore, be determined not with reference to the above description, but instead should be determined with reference to the pending claims along with their full scope or equivalents.

One or more features from any embodiment may be combined with one or more features of any other embodiment without departing from the scope of the invention.

A recitation of "a", "an" or "the" is intended to mean "one or more" unless specifically indicated to the contrary.

All patents, patent applications, publications, and descriptions mentioned above are herein incorporated by reference in their entirety for all purposes. None is admitted to be prior art.

What is claimed is:

1. A method comprising:
receiving, by a server computer, a first set of user information and a first device fingerprint from a first mobile application associated with an authorizing server, wherein the first device fingerprint is associated with a user device of a user storing the first mobile application, wherein the first device fingerprint is generated based on instructions executed by the first mobile application, wherein the first set of user information received from the first mobile application includes an authentication indicator generated by the authorizing server;
storing, by the server computer, the received first set of user information;
receiving, by the server computer, a request for a token representing an account of the user from a second mobile application, the request comprising at least a second set of user information and a second device fingerprint, wherein the second device fingerprint is generated based on instructions executed by the second mobile application;
comparing the first device fingerprint with the second device fingerprint;
comparing the second set of user information with the first set of user information;
generating, by the server computer, the token representing the account of the user along with a status associated with the token, wherein the status of the token is based on a level of correlation between the first set of user information and the second set of user information and based on a match between the first device fingerprint and the second device fingerprint, wherein the status of the token determines parameters of a transaction using the token;
storing, by the server computer, the token, the first device fingerprint and the second device fingerprint;
transmitting, by the server computer, the token to the second mobile application,
receiving, by the server computer, a transaction authorization request message including the token, wherein the transaction authorization request message requests authorization for a transaction where the second mobile application transmitted the token to a transacting entity;
processing, by the server computer, the transaction using the token, the transaction subject to the parameters defined by the status of the token; and
transmitting, by the server computer, a transaction authorization response message to the transacting entity, the transaction authorization response message indicating that the transaction is authorized or declined within the parameters defined by the status of the token.

2. The method of claim 1, further comprising:
determining, by the server computer, a confidence level based on the comparing of the first device fingerprint with the second device fingerprint or the comparing of the second set of user information with the first set of user information, wherein the status of the token is based at least in part on the confidence level.

3. The method of claim 2, wherein the status of the token is indicative of a level of restriction associated with the token.

4. The method of claim 2, further comprising:
changing the status of the token based at least in part on a transaction history provided by the second mobile application.

5. The method of claim 1, wherein the status of the token is based at least in part on the authentication indicator.

6. The method of claim 1, further comprising:
receiving, from the authorizing server, an identity assertion as part of the first set of user information, wherein the status of the token is based at least in part on the identity assertion.

7. The method of claim 1, further comprising:
receiving, from the authorizing server, an indication of an WL-based security layer validation associated with a user of the second mobile application, wherein the status of the token is based at least in part on the XML-based security layer validation.

8. The method of claim 1, wherein the first mobile application and the second mobile application are stored on the user device.

9. The method of claim 1, wherein the first mobile application is stored on a first user device and the second mobile application is stored on a second user device, wherein the first user device and the second user device are accessible via a common username and password.

10. The method of claim 1, wherein:
the first set of user information includes one or more of an account number, an address, a zip code, a name, a username, a telephone number or an identity assertion, and
the second set of user information includes one or more of an account number, an address, a zip code, a name, a username, a telephone number, user credentials or a user authentication verification value.

11. A server computer comprising a processor and a computer readable medium comprising code, executable by the processor, for implementing a method comprising:
receiving a first set of user information and a first device fingerprint from a first mobile application associated with an authorizing server, wherein the first device fingerprint is associated with a user device of a user storing the first mobile application, wherein the first device fingerprint is generated based on instructions executed by the first mobile application, wherein the first set of user information received from the first mobile application includes an authentication indicator generated by the authorizing server;
storing the received first set of user information;
receiving a request for a token representing an account of the user from a second mobile application, the request comprising at least a second set of user information and a second device fingerprint, wherein the second device fingerprint is generated based on instructions executed by the second mobile application;
comparing the first device fingerprint with the second device fingerprint;
comparing the second set of user information with the first set of user information;
generating the token representing the account of the user along with a status associated with the token, wherein the status of the token is based on a level of correlation between the first set of user information and the second set of user information and based on a match between the first device fingerprint and the second device fingerprint, wherein the status of the token determines restrictions on a transaction using the token;

storing the token, the first device fingerprint and the second device fingerprint;

transmitting the token to the second mobile application;

receiving a transaction authorization request message including the token, wherein the transaction authorization request message requests authorization for a transaction where the second mobile application transmitted the token to a transacting entity;

processing the transaction using the token subject to the restrictions defined by the status of the token; and transmitting a transaction authorization response message to the transacting entity, the transaction authorization response message indicating that the transaction is authorized or declined based on the restrictions defined by the status of the token.

12. The server computer of claim 11, wherein the method further comprises:

determining a confidence level based on the comparing of the first device fingerprint with the second device fingerprint or the comparing of the second set of user information with the first set of user information, wherein the status of the token is based at least in part on the confidence level, the status of the token being indicative of a level of restriction associated with the token.

13. The server computer of claim 12, wherein the method further comprises:

changing the status of the token based at least in part on a transaction history provided by the second mobile application.

14. The server computer of claim 11, wherein the status of the token is based at least in part on the authentication indicator.

15. The server computer of claim 14, wherein the authentication indicator includes an identity assertion or an indication of an XML-based security layer validation associated with a user of the second mobile application.

16. The method of claim 1, further comprising:

generating, by the server computer, a first token, wherein a status of the first token is based on the first set of user information; and transmitting, by the server computer, the first token to the first mobile application, wherein the status of the first token is the same as the status of the token when the first set of user information matches the second set of user information.

17. The method of claim 1, further comprising:

generating, by the server computer, a first token, wherein a status of the first token is based on the first set of user information; and transmitting, by the server computer, the first token to the first mobile application, wherein the status of the first token is different from the status of the token when the second set of user information is different from the first set of user information.

18. The method of claim 1, wherein the token is associated with a user account issued by an authorization entity, wherein the first mobile application is associated with the authorization entity.

19. The method of claim 18, further comprising:

generating, by the server computer, a first token, wherein a status of the first token is based on the first set of user information provided by the first mobile application associated with the authorization entity; and transmitting, by the server computer, the first token to the first mobile application, wherein the status of the first token indicates a trusted status, and the status of the token generated based on the second set of user information indicates an untrusted status.

20. The method of claim 18, further comprising:

determining, by the server computer, that a given token is associated with a plurality of device fingerprints; and executing, by the server computer, an inquiry when a number of the plurality of device fingerprints is higher than a predetermined number.

* * * * *

UNITED STATES PATENT AND TRADEMARK OFFICE
CERTIFICATE OF CORRECTION

| | | |
|---|---|---|
| PATENT NO. | : 11,023,890 B2 | Page 1 of 1 |
| APPLICATION NO. | : 14/732458 | |
| DATED | : June 1, 2021 | |
| INVENTOR(S) | : Shastry et al. | |

It is certified that error appears in the above-identified patent and that said Letters Patent is hereby corrected as shown below:

In the Claims

In Column 24, Line 20, Claim 7, please remove "WL-based security layer validation" and insert -- XML-based security layer validation --

Signed and Sealed this
Sixteenth Day of November, 2021

Drew Hirshfeld
*Performing the Functions and Duties of the*
*Under Secretary of Commerce for Intellectual Property and*
*Director of the United States Patent and Trademark Office*